(12) United States Patent
Baun et al.

(10) Patent No.: US 11,846,271 B2
(45) Date of Patent: Dec. 19, 2023

(54) NACELLE FOR A WIND TURBINE

(71) Applicant: Vestas Wind Systems A/S, Aarhus N (DK)

(72) Inventors: Torben Ladegaard Baun, Skødstrup (DK); Jens Demtröder, Rønde (DK)

(73) Assignee: Vestas Wind Systems A/S, Aarhus N (DK)

( * ) Notice: Subject to any disclaimer, the term of this patent is extended or adjusted under 35 U.S.C. 154(b) by 23 days.

(21) Appl. No.: 17/774,196

(22) PCT Filed: Nov. 20, 2020

(86) PCT No.: PCT/DK2020/050317
§ 371 (c)(1),
(2) Date: May 4, 2022

(87) PCT Pub. No.: WO2021/098928
PCT Pub. Date: May 27, 2021

(65) Prior Publication Data
US 2022/0349390 A1 Nov. 3, 2022

(30) Foreign Application Priority Data
Nov. 22, 2019 (DK) .......................... PA 2019 70714

(51) Int. Cl.
*F03D 80/80* (2016.01)
*F03D 9/25* (2016.01)
(Continued)

(52) U.S. Cl.
CPC ............... *F03D 80/82* (2016.05); *F03D 9/25* (2016.05); *F03D 13/10* (2016.05); *F03D 13/20* (2016.05);
(Continued)

(58) Field of Classification Search
CPC .......... F03D 80/82; F03D 80/821; F03D 9/25; F03D 13/10; F03D 13/20
See application file for complete search history.

(56) References Cited

U.S. PATENT DOCUMENTS 8,011,893 B2 * 9/2011 Stiesdal .................. F03D 13/10
416/204 R
2011/0140446 A1 6/2011 Knoop
(Continued)

FOREIGN PATENT DOCUMENTS

DE 10013442 C1 10/2001
EP 2043254 A2 4/2009
(Continued)

OTHER PUBLICATIONS

Danish Patent and Trademark Office, Search and Examination Report in PA 2019 70714, dated May 11, 2020.
(Continued)

*Primary Examiner* — Michael L Sehn
(74) *Attorney, Agent, or Firm* — Wood Herron & Evans LLP

(57) ABSTRACT

A wind turbine nacelle configured for mounting on a wind turbine tower and for supporting a rotor-supporting assembly, the nacelle comprising a main unit, and at least one auxiliary unit. The auxiliary unit accommodates at least one operative component, e.g. a converter, a transformer, an electrolysis cell, or a battery. An operative component having a similar function is accommodated in another auxiliary unit which thereby facilitate shared operation, and easy and fast maintenance or replacement of the operative component.

23 Claims, 15 Drawing Sheets

(51) Int. Cl.
    *F03D 13/10*     (2016.01)
    *F03D 13/20*     (2016.01)
    *F03D 17/00*     (2016.01)
    *F03D 80/50*     (2016.01)
    *H02J 3/00*     (2006.01)
    *H02J 3/38*     (2006.01)

(52) U.S. Cl.
    CPC ............. *F03D 17/00* (2016.05); *F03D 80/50* (2016.05); *H02J 3/0073* (2020.01); *H02J 3/381* (2013.01); *F05B 2220/706* (2013.01); *H02J 2300/28* (2020.01)

(56) References Cited

U.S. PATENT DOCUMENTS

| | | | |
|---|---|---|---|
| 2013/0011272 A1* | 1/2013 | Mortensen | F03D 13/10 |
| | | | 416/244 R |
| 2013/0115099 A1* | 5/2013 | Valero Lafuente | F03D 80/50 |
| | | | 416/244 R |

FOREIGN PATENT DOCUMENTS

| | | |
|---|---|---|
| EP | 2412970 A1 | 2/2012 |
| EP | 3247899 A1 | 11/2017 |
| EP | 3276169 A1 | 1/2018 |
| WO | 2011117005 A2 | 9/2011 |

OTHER PUBLICATIONS

European Patent Office, International Search Report and Written Opinion in PCT Application No. PCT/DK2020/050317, dated Feb. 9, 2021.

\* cited by examiner

NACELLE FOR A WIND TURBINE

INTRODUCTION

The present disclosure relates to a nacelle for a wind turbine, the nacelle comprising a main unit and two auxiliary units mounted on the main unit. The nacelle of the present disclosure is particularly suitable for use in large wind turbines. The disclosure further relates to a method for operating a wind turbine comprising such a nacelle.

BACKGROUND

Wind turbines increase in size in terms of nominal power output as well as in terms of physical dimensions of the individual parts of the wind turbine. Therefore, the size of the nacelle must also be increased to accommodate the required wind turbine components. Wind turbines are normally transported from the location or locations of manufacture of the individual parts to the operating site where the wind turbine is erected.

SUMMARY

It is an object of embodiments of the disclosure to facilitate further modularity, ease of design and manufacturing and to allow for improved maintenance schedules of wind turbines. It is a further object of embodiments of the disclosure to provide a nacelle which is transportable using ordinary transport means and to lower transportation and handling costs without limiting the possible size of the nacelle and to provide a wind turbine allowing for very fast and efficient maintenance and repair.

According to these and other objects, the disclosure provides a wind turbine nacelle configured for mounting on a wind turbine tower and for supporting a rotor-supporting assembly defining a rotational axis, the nacelle comprising:
 a main unit arranged to be connected to a wind turbine tower and housing the rotor-supporting assembly,
 a first auxiliary unit, and
 a second auxiliary unit;
wherein:
  the main unit, the first auxiliary unit, and the second auxiliary unit are separate units,
  the first auxiliary unit is assembled to the main unit in a first interface,
  the second auxiliary unit is assembled to the main unit in a second interface, and
  the first auxiliary unit accommodates a first operative component forming part of the power conversion assembly and having a function being similar to a function of a corresponding second operative component accommodated in the second auxiliary unit.

Since two auxiliary units contain identically functioning operative components, the size of each individual operative component can be reduced. This is an advantage during assembly of the wind turbine, and typically an advantage during operation of the wind turbine.

Due to the identically functioning components, the nacelle may allow redundant operation and, in case of malfunction of one of the first and second operative components, the other one of the first and second operative components may take over while the malfunctioning operative component is replaced. Furthermore, replacement of the malfunctioning operative component may efficiently be carried out by replacement of the entire auxiliary unit in which the malfunctioning operative component is accommodated. This provides efficient operation of the wind turbine with reduced down time and efficient maintenance and repair.

An electronic control structure may be configured for controlling both operative component. The electronic control structure may e.g. comprise redundant control units each configured for independent operation of one or both of the first and second operative components.

Particularly, the electronic control structure may be accommodated outside the first auxiliary unit and outside the second auxiliary unit. This will allow easy replacement of one or both of the auxiliary units, and it may particularly allow replacement of one of the auxiliary units while the other auxiliary unit is operational, vice, versa.

The electronic control structure may e.g. be located at the base of the wind turbine tower, or in the main unit, or it may be accommodated in a separate auxiliary unit.

The at least one operative component may be constituted by a converter, a transformer, an electrolysis cell stack, and/or a battery. Specifically, these wind turbine operative components may be subject to wear and deterioration, and repair or replacement may be necessary during the lifetime of a wind turbine.

The main unit and auxiliary unit may be transported separately and assembled to one or more other units to form the nacelle. Each of the auxiliary and main units may have the size and/or shape of a shipping freight container. Each unit thereby inherits the advantages of shipping freight containers with respect to handling, transportation, and storage. Shipping freight containers can for example be handled anywhere in the world by ship, train, and truck etc. and at lower costs compared to bulk transport. The cost savings are even more pronounced by shipping freight containers constituting the units. A shipping freight container is also referred to as an intermodal container, a standard freight container, a box container, a sea fright container, or an ISO container, and refers in general to a container used to store and move materials and products in the global containerized intermodal freight transport system for intercontinental traffic. The shipping freight container may follow the dimensional and structural specifications in the ISO standard of ISO 668:2013 for series 1 freight containers.

In one embodiment, the nacelle comprises two auxiliary units each having half the size of one shipping freight container following the dimensional and structural specifications in the ISO standard of ISO 668:2013 for series 1 freight containers, and arranged such that the two half parts of the container can be assembled to one container during transport, and split into two auxiliary units to be arranged e.g. on opposite sides of the main unit. The container may particularly be split in an interface extending in the longitudinal direction of the container.

The main unit is configured for mounting on a wind turbine tower which means that the nacelle is carried by the wind turbine tower via the main unit. That can be either directly or indirectly via intermediate tower structures. If the wind turbine is of the traditional horizontal axis type, the nacelle is typically carried by a yawing arrangement directly between the tower top and the nacelle. The disclosure may, however, also relate to a multiple rotor wind turbine of the kind where more than one nacelle are carried by a transverse beam structure which is again carried by the tower.

The disclosure may relate to an upwind wind turbine or to a downwind wind turbine.

The main unit is the part connecting the nacelle to the tower, either directly or indirectly via said intermediate tower structure or structures. The main unit may particularly be the central part of the nacelle and houses parts of the drivetrain such as at least a part of the rotor shaft.

The wind turbine could be a direct drive wind turbine with the generator typically placed outside the nacelle, or the wind turbine could be with the generator located e.g. in the main unit. The main unit supports the rotor via the rotor shaft.

The main unit may, depending on the type of wind turbine, comprise further parts, e.g. a gear box, a bearing system and different kinds of peripheral equipment, e.g. for lubrication, cooling, and control purpose. The main unit may particularly comprise a main frame connecting the drivetrain and the tower or intermediate tower structure, e.g. via a yawing arrangement. The main frame may particularly be a casted component.

The mainframe may be rotatable relative to the tower via a yawing arrangement. This may either be facilitated by connecting the main frame to the tower via the yawing arrangement, or by connecting at least two main frames of individual nacelle structures to a tower via said intermediate tower structure which is again joined to the tower via a yawing arrangement.

The power conversion assembly converts the power from the generator into a desired energy form. The power conversion assembly may be configured for delivering either electrical power, e.g. in AC or DC, or for converting electrical power from the generator into other forms of energy, e.g. into hydrogen, ammonia, or methanol.

In case of electrical energy, the power conversion assembly may be configured for linking the generator e.g. to an external power grid. In that case, the power conversion assembly may be constituted e.g. by a converter, a transformer, and a switch gear. Any such components may be comprised in the power conversion assembly.

The generator may, as an example, be an asynchronous or synchronous generator, e.g. an asynchronous or synchronous generator, and the converter voltage may be in same range as a generator voltage, sometimes referred to as Stator voltage.

The generator, in another example, may be a doubly fed induction generator (DFIG). In that case, the voltage on the converter could be different from the Generator stator voltage. The converter is connected to generator rotor and is normally the same voltage or a lower voltage compared to the stator voltage.

Low voltage may e.g. be considered as voltages up to 1000V. Medium voltage may be considered as voltages of 1 KV to about 60 kV. The generator voltage could be low voltage, or medium voltage.

In a wind turbine configured for producing hydrogen, ammonia, or methanol, the power conversion assembly may comprise an electrolysis cell configured for generating the substance based on electrical power from the generator.

In other embodiments, the wind turbine may store energy, and the power conversion assembly may comprise a battery.

The operative component may therefore be constituted by an electrolysis cell stack, or by a converter and/or a transformer, or a battery etc. Such components can suitably be housed in two individual auxiliary units thereby facilitating increased capacity by shared operation between operative components in individual auxiliary units.

The first operative component and the second operative component may be cabled individually by one cable for each identically functioning component from the nacelle to a junction. The junction could be in the nacelle, it could be just below the nacelle, e.g. just below the jawing arrangement, it could be at the base of the tower, or anywhere between the base of the tower and the nacelle. It could even be a junction remote from the wind turbine and covering a plurality of wind turbines, where each of the plurality of wind turbines connect to the junction with one cable for each identically functioning operative component. Accordingly, each cable may have a reduced power rating compared to a cable conducting the combined output from the operative components. Further, redundant operation and the ability to utilise only one out of two possible operative components can be utilised all the way to the junction.

The electronic control structure may e.g. constitute a controller for a transformer, a converter, a cooling system, or a controller for other systems contained in the auxiliary units.

In one example, the electronic control structure is for a converter, e.g. comprising a PMSM (permanent magnet synchronous machine) generator and an active rectifier which converts the AC output of the wind turbine into a DC voltage. The resulting DC voltage output from the rectifier is provided to a full bridge inverter (DC/AC converter) which is coupled to an AC/DC converter via a monolithic transformer with a single secondary winding. The AC/DC converter is composed of a series resonant tank (LC circuitry), rectifier and output filter. An electronic control structure drives the DC/AC converter, and in particular controls transistor switches of the DC/AC converter using a pulse width modulation (PWM) signal. The controller receives as inputs a signal from the AC/DC converter indicating the output voltage Vo and rectified current [Ir], and an input from the DC/AC converter indicating the input voltage Vg and input dc current. Based on the received signals, the controller decides on a suitable switching frequency and/or phase shift for the transistor switches.

In another example, the electronic control structure is a controller for controlling the entire operation of the wind turbine.

A bus-bar structure may form electrical connection from the electronic control structure to the first and the second operative components. The bus-bar may extend from the main unit into the first and second auxiliary units, e.g. through openings in side walls of the main and auxiliary units. The bus-bar structure may comprise a set of flexible bus-bar connectors connecting bus-bars in the main unit with bus-bars in the auxiliary units.

The electronic control structure may, alternatively, or additionally be implemented in a switch gear arranged between the operative component and an external power grid receiving electrical power from the wind turbine. The switchgear may particularly be configured for connecting one of the identically functioning operative components into or out of contact with the grid. Accordingly, zero, one, or two transformers, converters and/or batteries may be connected to the grid and provide power output from the wind turbine.

The electronic control structure may therefore be used both to down or upgrade the performance of the wind turbine and to switch out selected malfunctioning operative components such that they can be replaced while the identically functioning operative component is still operational.

Remote operable controls for the switching between the independent operation of one or both of the first and second operative components may allow shifting e.g. from an external control centre and it may allow continued operation if one of the two identically functioning operative components has a malfunction.

The switch gear could advantageously be at a base of the wind turbine tower.

The main unit and the auxiliary units are assembled via the first and second interfaces. The interfaces may be particularly suitable for allowing release of the auxiliary units from the main unit after the main unit is assembled on the tower top. That will allow the interfaces to be used for fast and efficient replacement of a malfunctioning operative component by replacement of an entire auxiliary unit. For that purpose, each interface may comprise mutually interlocking structural features on the main unit and on the auxiliary unit. Examples of such mutually interlocking features may be protrusions on one of the main and auxiliary unit and indentations or holes on the other one of the main and auxiliary unit, the interface may be a bolted interface allowing releasable joining of the main and auxiliary units, or the auxiliary unit may be held in place on the main unit by cables by which the auxiliary unit can be lowered to the ground for service, replacement of operative components or for transport of operative components and personnel between ground and the nacelle. In one embodiment, the interface is configured such that the auxiliary unit can be received by the main unit when the auxiliary unit is lowered in close vicinity to the main unit. Such an interface may be constituted by hooks or an upwardly and outwardly projecting ledge on at least one of the main unit and the auxiliary unit.

The first interface and the second interface may be configured for independent fixation of a corresponding auxiliary unit and they may both allow release of that auxiliary unit independent of the other auxiliary unit. This allows replacement of one auxiliary unit and the operative component accommodated therein without detachment of the other auxiliary unit and the operative component accommodated therein.

The two auxiliary units could be arranged on opposite sides of the main unit. In that embodiment, the two auxiliary units may be on opposite sides of, and therefore separated by, a vertical plane in which the rotational axis extends, i.e. a vertical plane through the rotor shaft. Such a plane would be determined by the rotational axis and a point vertically above the rotational axis.

The two auxiliary units could also be arranged above each other on one side of the main unit or two units above each other could be placed on both sides of the main unit. In that case, the two auxiliary units may e.g. be on opposite sides of a horizontal plane in which the rotational axis extends.

In one embodiment, both a transformer and a converter are housed in both the first and in the second auxiliary unit. In another embodiment, a transformer and a battery are housed both in the first and in the second auxiliary unit. In another embodiment, a converter and a battery are housed both the first and in the second auxiliary unit. In another embodiment, a transformer, a converter, and a battery are housed both in the first and in the second auxiliary unit.

The at least one operative component, i.e. e.g. the transformer, converter and/or battery, may comprise an electrical connector configured for electrical connection with a component in the main unit, typically the generator. The electrical connector may be connected via the interface between the main unit and the auxiliary unit. Particularly, this interface may allow connection or interruption of the connection from the main space in the main unit without entering the auxiliary unit or it may allow connection or interruption of the connection from the auxiliary space in the auxiliary unit without entering the main unit.

The first and second operative components may be converter operative components configured for interleaving operation. Interleaving operation is sometimes referred to as multi-phasing, and it is an operation principle by which the size of filter components can be reduced. An interleaved converter is the equivalent of a parallel combination of two sets of switches, diodes, and inductors connected to a common filter capacitor and load and it may reduce the frequency of the converter from e.g. 4 kHz to 2.5 kHz and thereby reduce loss considerably.

In one embodiment, the main unit and the auxiliary units are joined in an interface forming a gap allowing air to pass from beneath the nacelle to above the nacelle through the gap. Such a gap may increase thermal convection and thus cooling of the space inside the main and auxiliary units.

In one embodiment, vibration damping material is arranged between the main unit and the auxiliary unit. Rubber or foam material, or material with a similar elastically deformable and vibration dampening effect may be used. The dampening material may particularly be compressed between the main unit and the auxiliary unit and it may particularly be arranged where the main unit and the auxiliary unit are fixed by nails, rivets, bolts or any similar mechanical attachment. Additionally, damping material may be arranged between the main frame in the main unit, particularly when the main frame is a one-piece, casted component, connecting directly to the yawing assembly. This may prevent tonality issues, particularly when combining with auxiliary units.

In one embodiment, the main unit is broader than the auxiliary unit(s). That the main unit is "broader" means that its dimension in a horizontal plane, and perpendicular to the rotational axis is larger than the same dimension of the auxiliary unit(s). The main unit may particularly be broader than a shipping freight container following the dimensional and structural specifications in the ISO standard of ISO 668:2013 for series 1 freight containers, whereas the auxiliary unit(s) may have the size of, or be smaller than what is specified for those ISO standard, ISO 668:2013, series 1 freight containers.

In one embodiment, the main unit comprises a cantilever beam structure movable between a suspended and a retracted configuration. In the suspended configuration, the cantilever beam structure forms at least one and optionally several outwards projecting cantilevers configured to carry an auxiliary unit and usable for hoisting an auxiliary unit towards and away from the main unit. The outwards projecting cantilever beam structure may particularly be attached on a roof part of the main unit.

The electronic control structure could be located in the main unit, or it could be located outside the nacelle, e.g. in the tower of the wind turbine. The nacelle may comprise a communication structure for communicating control signals between the operative components and the electronic control structure, the communication structure may e.g. comprise a cable connection out of the nacelle, e.g. directly into the tower.

In a second aspect, the invention provides a wind turbine with a tower and a nacelle as described above. The wind turbine may have a generator located outside the nacelle and/or the electronic control structure accommodated in the tower.

In a third aspect, the disclosure provides a method of operating a wind turbine with a nacelle according to the first aspect. Particularly, the method relates to operation of a wind turbine with such a nacelle during malfunction in an operative component forming part of the power conversion assembly.

The method comprises:
identifying the malfunctioning operative component;

identifying an auxiliary unit housing the malfunctioning operative component;

disconnecting the malfunctioning operative component from the wind turbine;

disconnecting the identified auxiliary unit housing the malfunctioning operative component;

connecting a substitute auxiliary unit housing a replacement operative component; and connecting the replacement operative component to the wind turbine.

The method may comprise continuing operation of the wind turbine by use of the operative component having a function being identical to the function of the malfunctioning operative component until the substitute auxiliary unit housing the replacement operative component has been connected to the wind turbine.

The method may comprise controlling the malfunctioning operative component, the operative component having a function being identical to the function of the malfunctioning operative component, and the replacement operative component by use of the same electronic control structure.

All operative components may be controlled from a location outside the first and second auxiliary units, particularly from the main unit.

LIST OF EMBODIMENTS

1. A wind turbine nacelle (2) configured for mounting on a wind turbine tower (3) and housing a rotor-supporting assembly defining a rotational axis and comprising a generator (33), and a power conversion assembly, the nacelle comprising:
   a main unit arranged to be connected to a wind turbine tower and housing the rotor-supporting assembly,
   a first auxiliary unit, and
   a second auxiliary unit;
   wherein:
   the main unit, the first auxiliary unit, and the second auxiliary unit are separate units,
   the first auxiliary unit is assembled to the main unit in a first interface,
   the second auxiliary unit is assembled to the main unit in a second interface, and
   the first auxiliary unit accommodates a first operative component forming part of the power conversion assembly and having a function being identical to a function of a corresponding second operative component accommodated in the second auxiliary unit.
2. The nacelle according to embodiment 1, wherein both the first operative component and the second operative component are selected from the group consisting of: transformers, converters, batteries, and electrolysis cells.
3. The nacelle according to embodiment 1 or 2, comprising an electronic control structure configured for controlling both of the first and second operative component.
4. The nacelle according to embodiment 3, wherein the electronic control structure comprises redundant control units each configured for independent operation of one or both of the first and second operative components.
5. The nacelle according to embodiment 3 or 4, wherein the electronic control structure is accommodated outside the first auxiliary unit and outside the second auxiliary unit.
6. The nacelle according to any of the embodiments 3-5, comprising remote operable controls for the switching between the operation of one or both of the first and second operative components.
7. The nacelle according to any of the preceding embodiments, wherein both the first operative component and the second operative component are coupled electrically to a switching structure, the switching structure being arranged between operative components and a power grid and configured for selection between the first operative component, the second operative component, or both the first and the second operative component being connected to the power grid.
8. The nacelle according to embodiment 7, wherein the switching structure is located in the nacelle or at a base of the tower.
9. The nacelle according to any of the preceding embodiments, wherein the first interface and the second interface are both configured for independent fixation of the corresponding auxiliary unit and wherein the first interface and the second interface allow release of the corresponding auxiliary unit independent of the other auxiliary unit.
10. The nacelle according to any of the preceding embodiments, wherein the first auxiliary unit and the second auxiliary unit are separated by a plane determined by the rotational axis.
11. The nacelle according to any of the preceding embodiments, wherein two auxiliary units are arranged above each other on one side of the main unit to form a lower and an upper auxiliary unit.
12. The nacelle according to any of the preceding embodiments, comprising a crane structure attached to the main unit and configured to hoist the auxiliary unit from ground to a position where a unit fixation structure can connect the auxiliary unit to the main unit.
13. The nacelle according to embodiment 12, wherein the crane structure is configured to hoist the auxiliary unit in a vertical direction without moving it in horizontal direction.
14. A method of operating a wind turbine with a nacelle according to any of embodiments 1-13 during malfunction in an operative component forming part of a power conversion assembly, the method comprising:
    identifying the malfunctioning operative component;
    identifying an auxiliary unit housing the malfunctioning operative component;
    disconnecting the malfunctioning operative component from the wind turbine;
    disconnecting the identified auxiliary unit housing the malfunctioning operative component;
    connecting a substitute auxiliary unit housing a replacement operative component; and
    connecting the replacement operative component to the wind turbine.
15. The method according to embodiment 14, wherein identified auxiliary unit is hoisted to, or lowered from the main unit by use of a crane structure attached to the main unit.
16. The method according to embodiment 15, wherein the auxiliary unit is hoisted only in a vertical plane by use of the crane structure.

LIST OF DRAWINGS

In the following, embodiments of the disclosure will be described in further details with reference to the drawing in which.

FIGS. 11a, 11b, 11c, and 11d illustrate details of a bus-bar connection between the generator and the operative component;

FIGS. 12-15 illustrate 4 different embodiments of interfaces between the main unit and the auxiliary unit.

Figure 16:
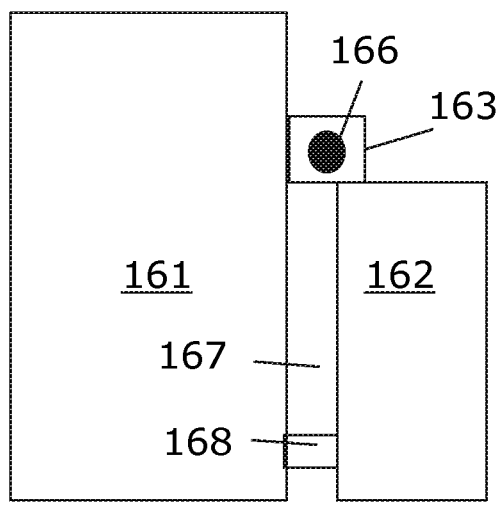
Figure 17:
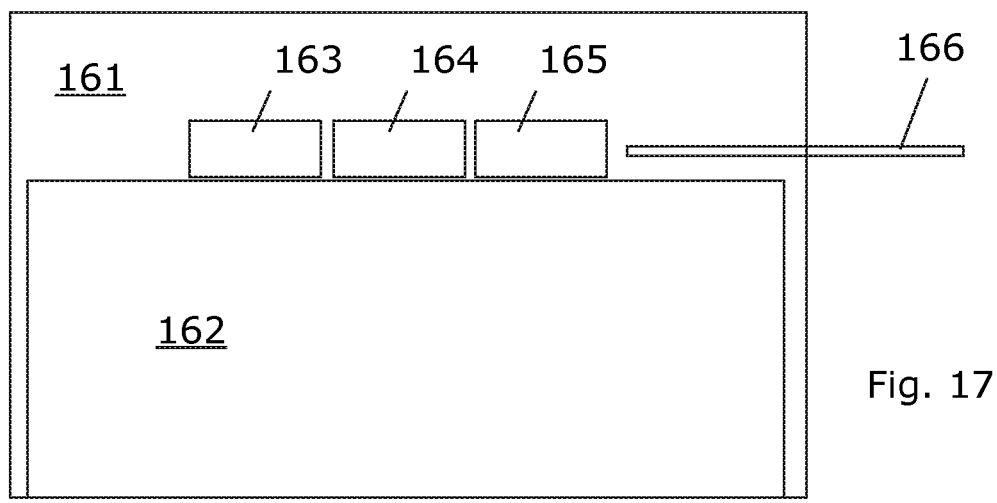
Figure 18:
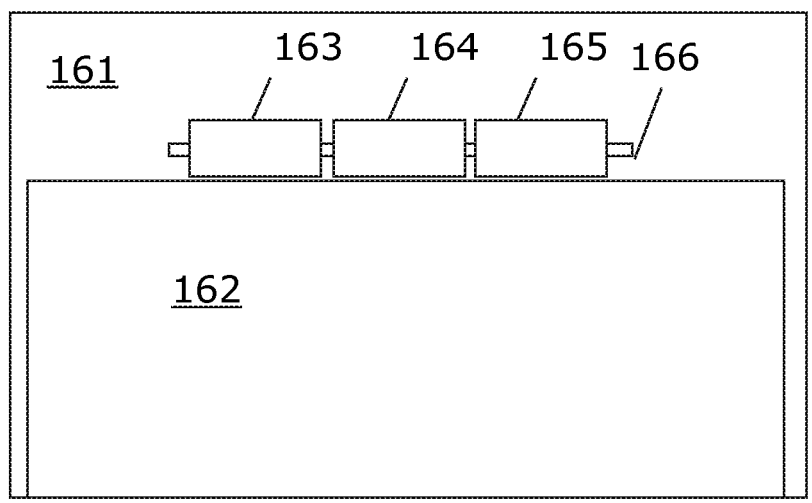
Figure 19:
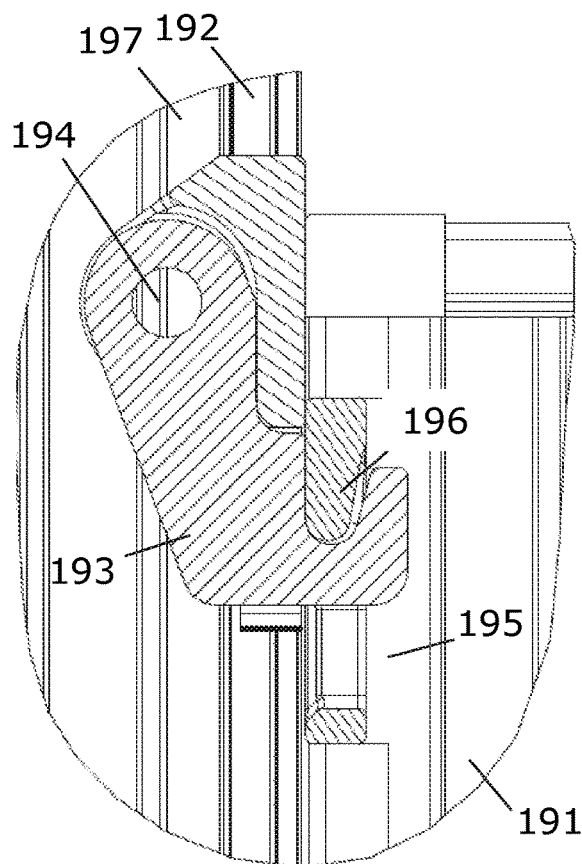
Figure 20:
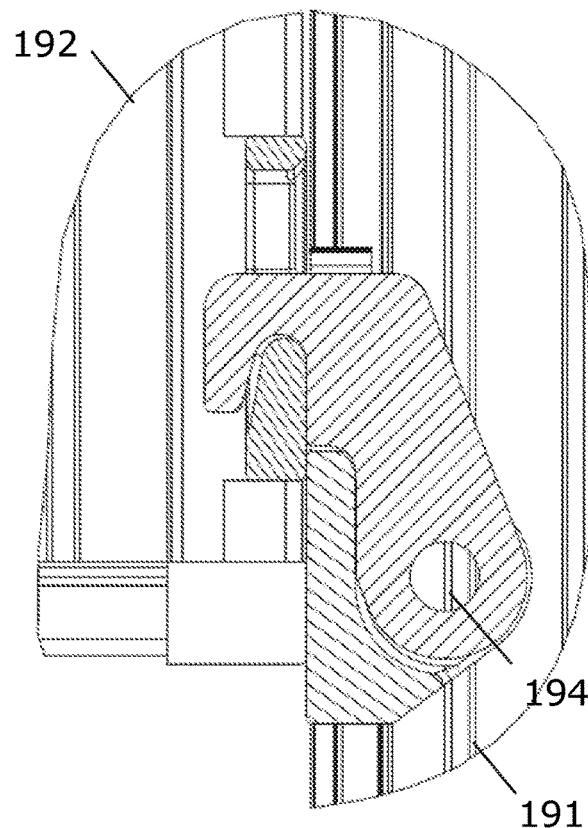
Figure 21:
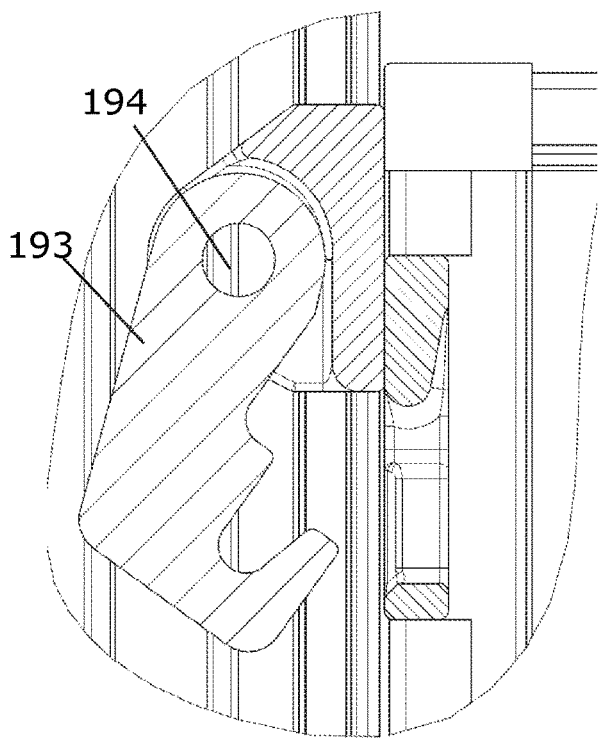
Figure 22:
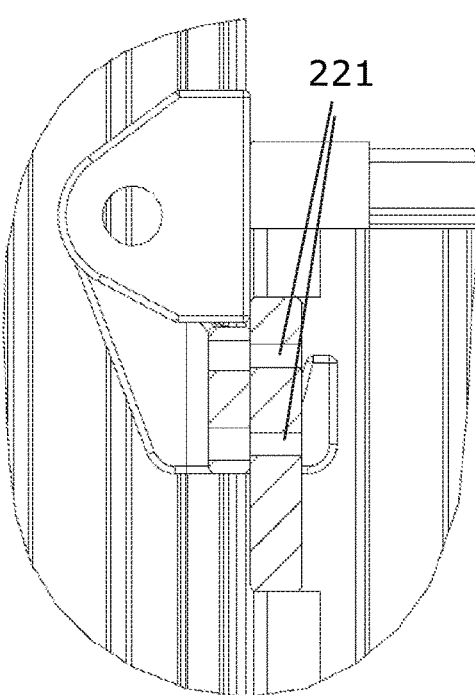
Figure 23:
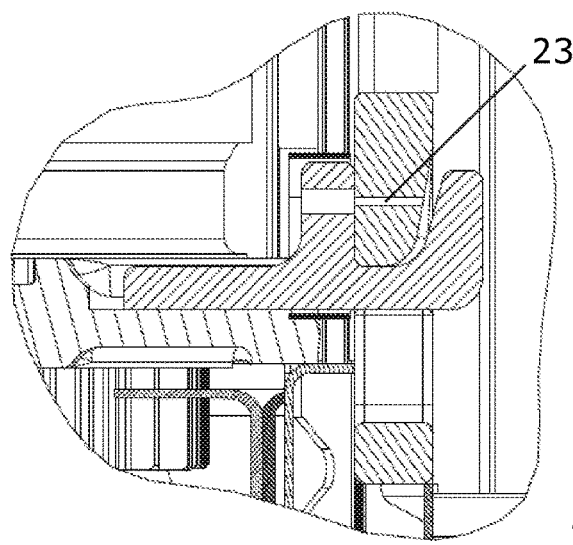
Figure 24:
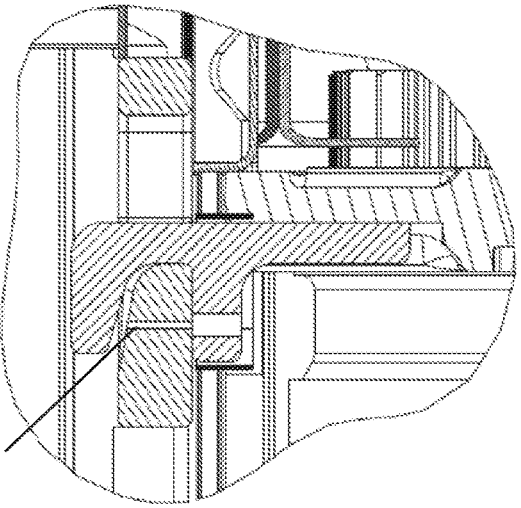
Figure 26:
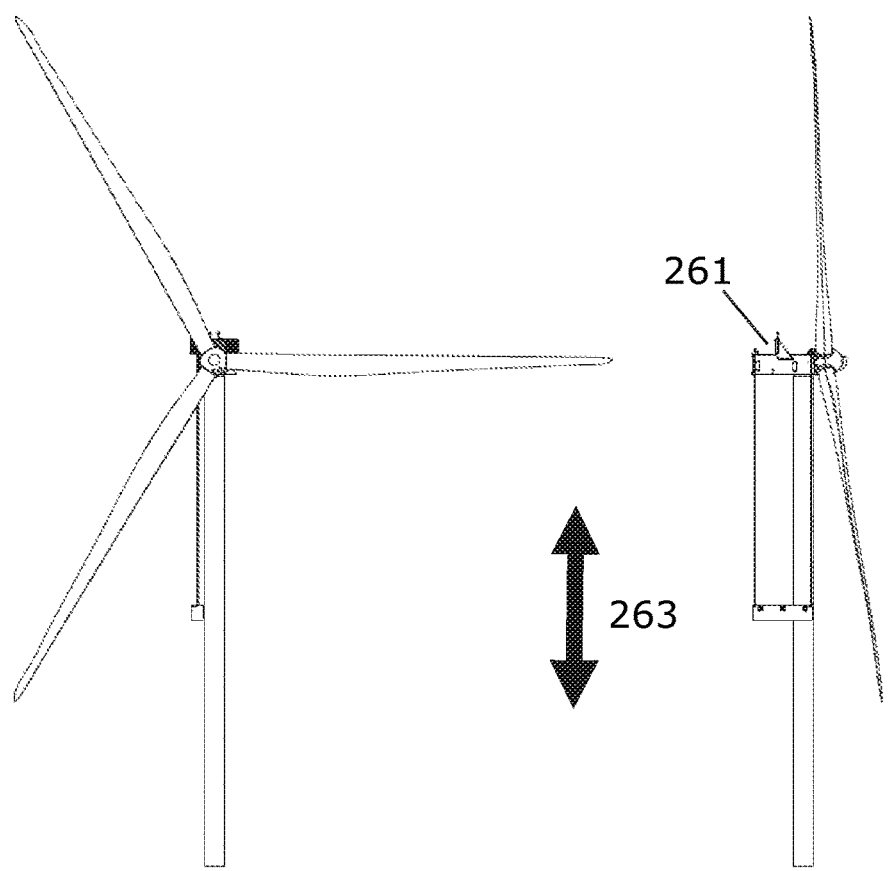
Figure 27:
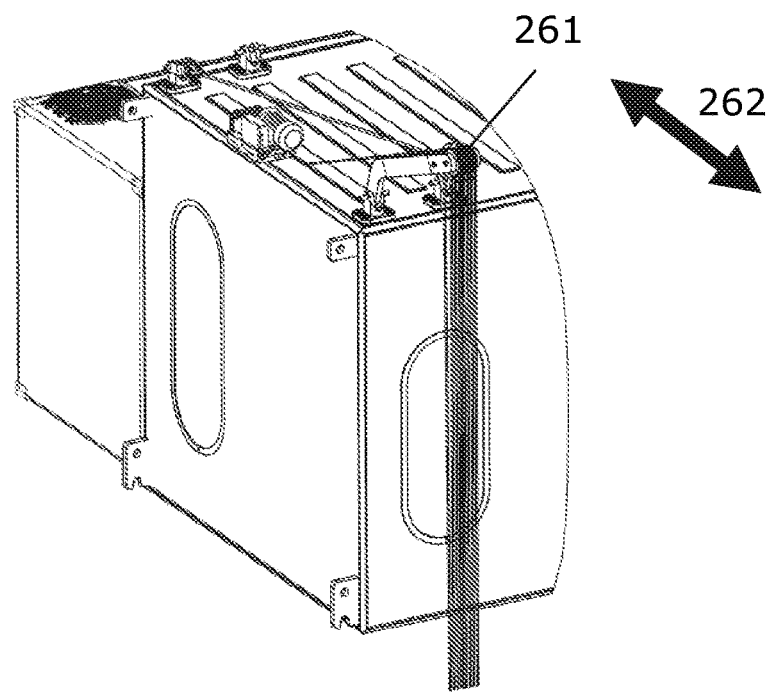
Figure 28:
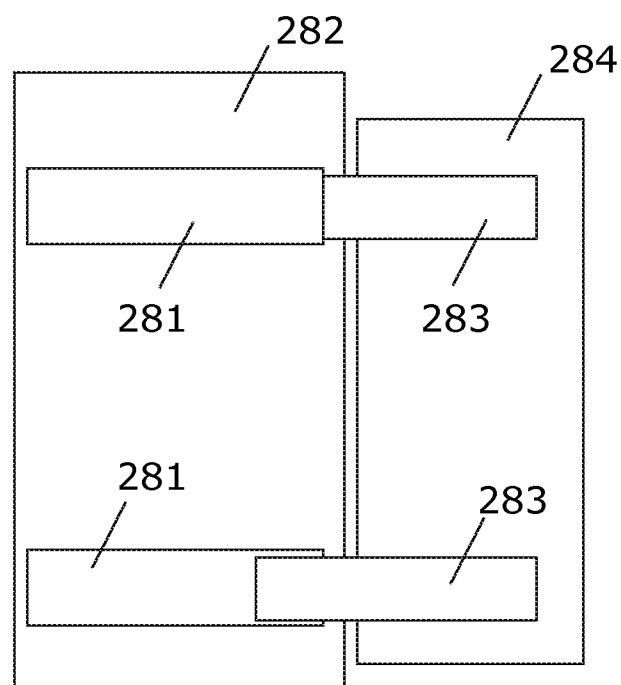

FIGS. 16-18 illustrate an embodiment where the main unit and auxiliary units are assembled by a hinge structure;

FIGS. 19, 20 illustrate further details of a hook for attaching the auxiliary unit to the main unit;

FIG. 21 illustrates the hook in an open position where the auxiliary unit is free to be lowered to the ground;

FIG. 22 illustrates a cross section with two bolt holes for attachment of the auxiliary unit on the main unit;

FIGS. 23, 24, 25 illustrate an embodiment where the hook is slidingly suspended; and;

FIGS. 26, 27, 28 illustrate a crane on the main unit for hoisting the auxiliary units.

DESCRIPTION OF EMBODIMENTS

The detailed description and specific examples, while indicating embodiments, are given by way of illustration only, since various changes and modifications within the spirit and scope of this disclosure will become apparent to those skilled in the art from this detailed description.

Figure 1A:
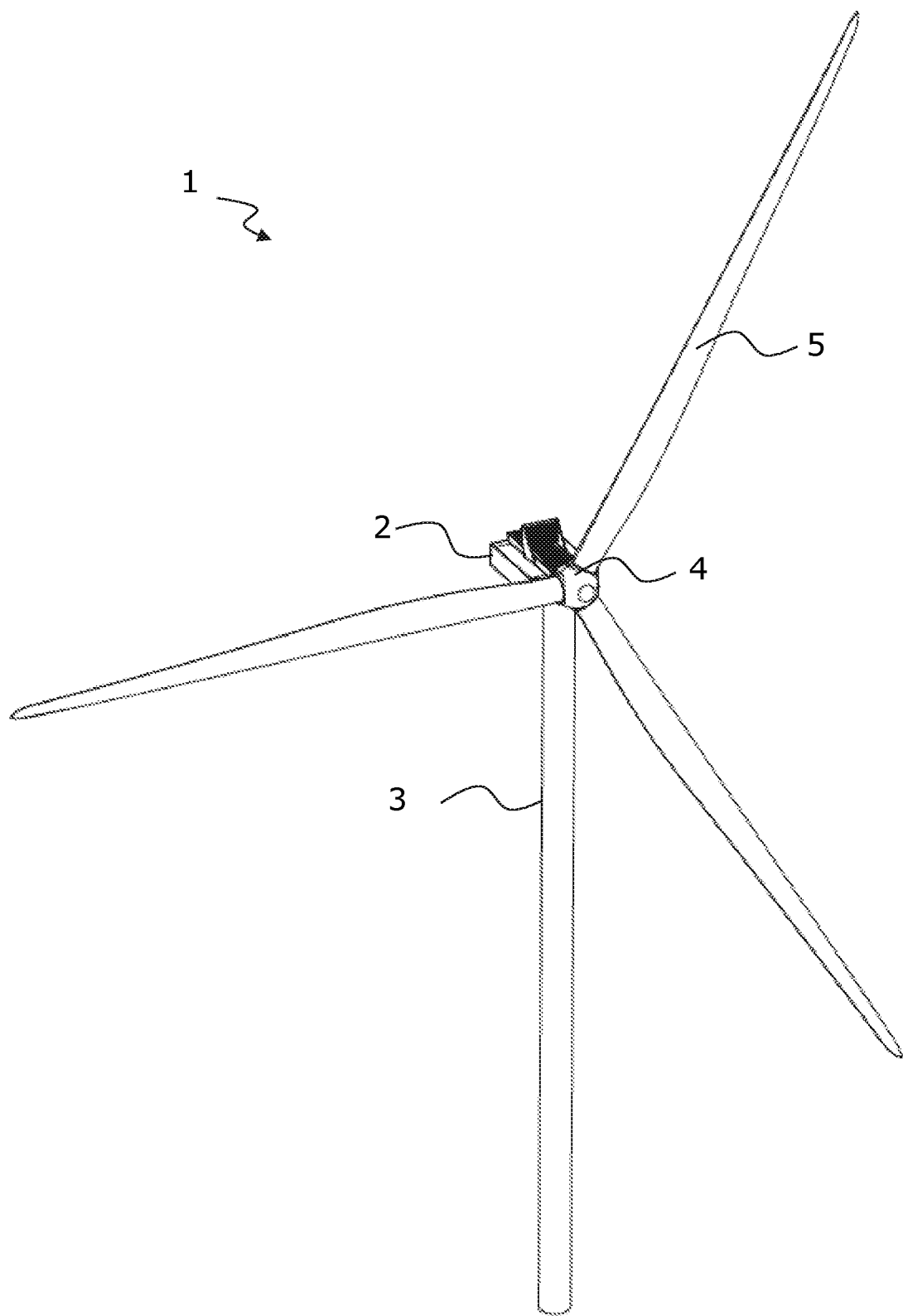
FIGS. 1a and 1b illustrate wind turbines.
Figure 1B:
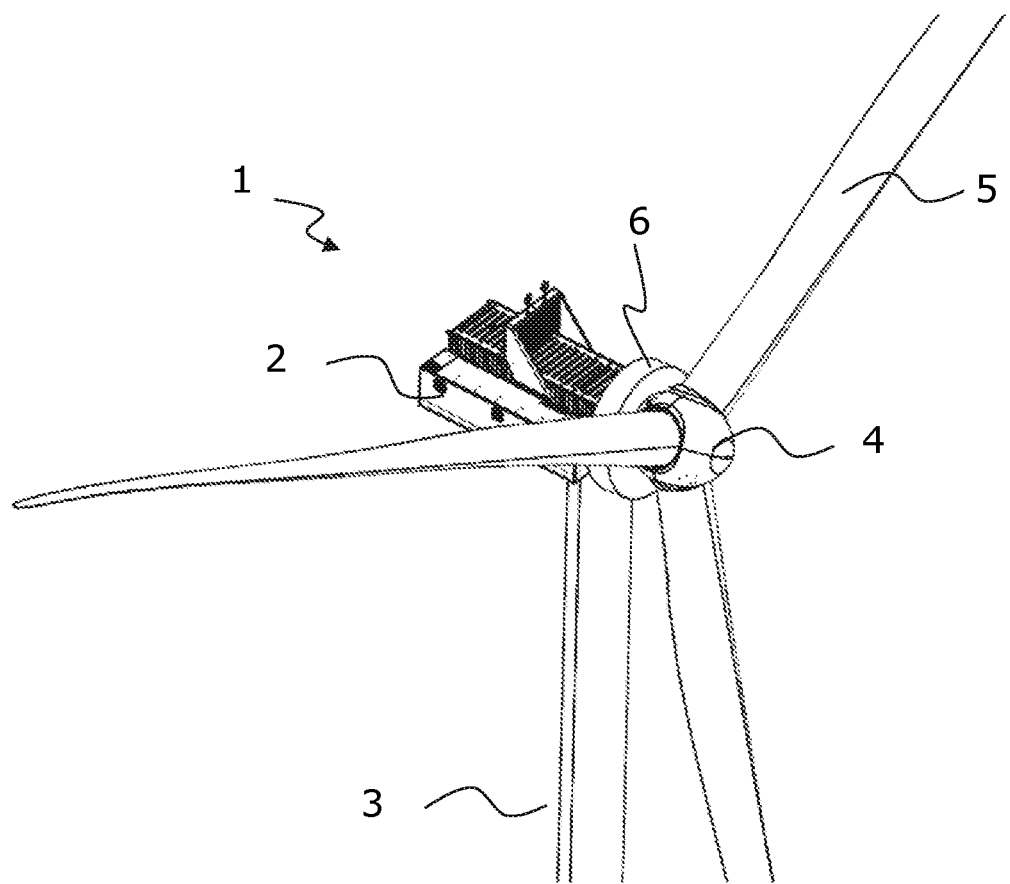

FIGS. 1a and 1b illustrate wind turbines 1 with a nacelle 2 mounted on a tower 3. A hub 4 carrying three rotor blades 5 forms a rotor and is carried by a rotor-supporting assembly in the nacelle 2. Typically, the rotor-supporting assembly comprises a rotor shaft connecting a gear arrangement and a generator to the hub. A gear is, however, not always required since the generator could be directly driven by the shaft. FIG. 1b illustrates a direct drive wind turbine with the generator 6 located outside the nacelle.

Figure 2:
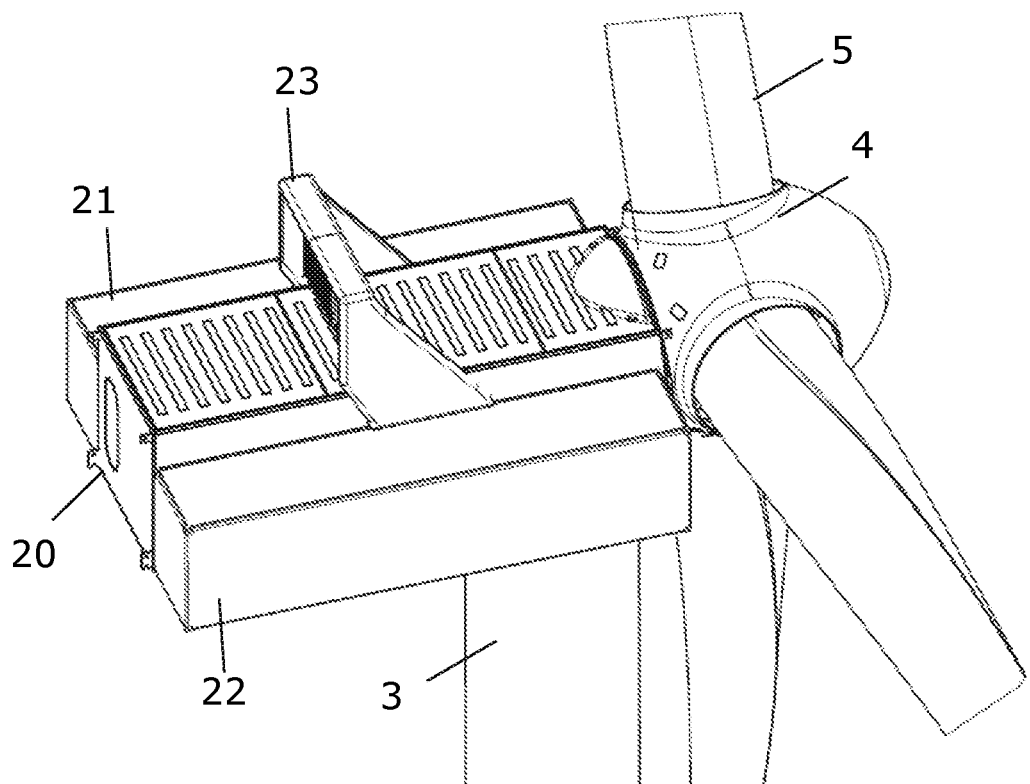
FIG. 2 illustrates the nacelle of the wind turbine.

FIG. 2 illustrates that the nacelle comprises a main unit 20 and two auxiliary units 21, 22. A cooling area 23 is arranged on top of the nacelle. The cooling area is formed by a heat exchanger which may form part of the main unit, and/or any of the auxiliary units. The main unit 20 is mounted on the tower 3 via a yawing arrangement (not shown), allowing the nacelle 2 to rotate in order to direct rotor blades carried by the hub 4 into the wind.

Figure 3:
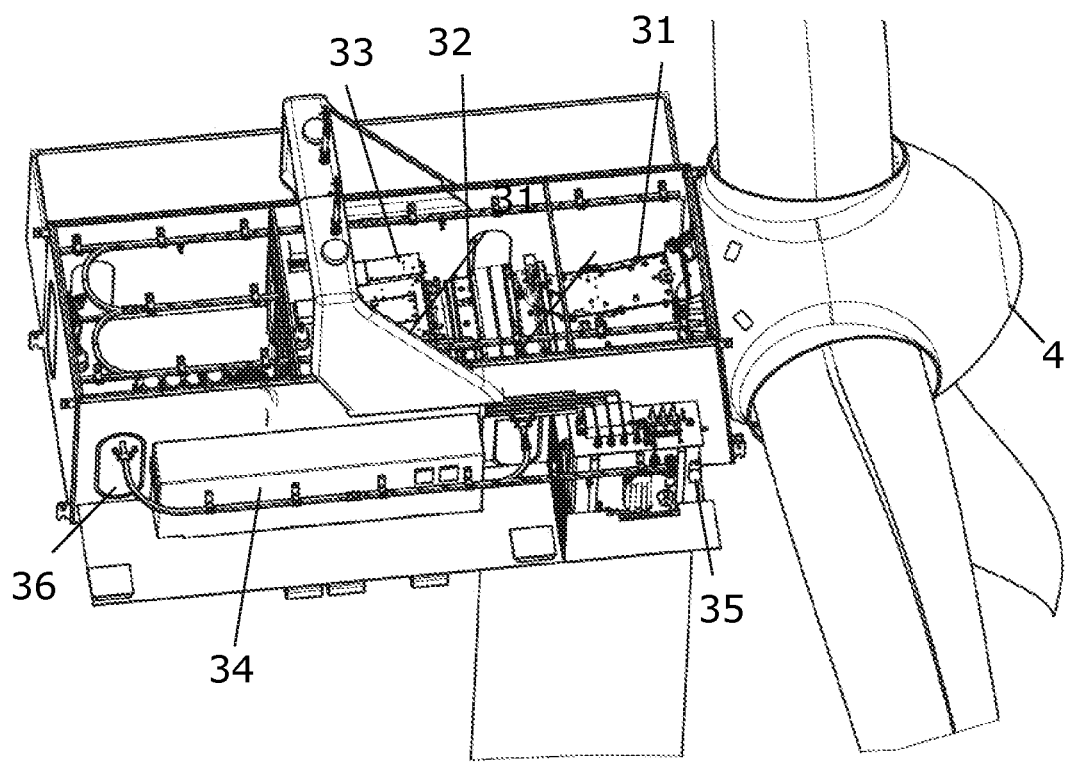
FIG. 3 illustrates a perspective view of the nacelle 2 of FIG. 2.

FIG. 3 illustrates a perspective view of the nacelle 2 of FIG. 2. In FIG. 3 the outer walls of the nacelle 2 are transparent, thereby revealing the interior parts of the nacelle 2 and the wind turbine components accommodated therein. The main unit 20 accommodates a main bearing unit 31 supporting a main shaft, a gear arrangement 32 and a generator 33, arranged sequentially behind the hub 4, along a direction defined by the rotational axis of the hub 4. The components in the main unit mainly belong to the drivetrain.

The auxiliary unit 21 accommodates a transformer unit 34, and a converter unit 35 which herein constitute two operative components being accommodated in the auxiliary unit.

Each auxiliary unit 21, 22 is mounted along a side of the main unit 20 via an interface. In the disclosed embodiment, they are mounted in such a manner that one auxiliary unit 21 is mounted along a right side of the main unit 20 and the other auxiliary unit 22 is mounted along a left side of the main unit 20, as seen in a direction along a rotational axis of the hub 4 from the hub 4 towards a rear wall of the main unit 20.

The transformer unit 34 and the converter unit 35 may be suspended directly on the main unit 20. I.e. the transformer unit 34 and the converter unit 35 are both contained in the auxiliary unit, but a direct load caused by the transformer and converter is carried directly by the main unit 20.

The main unit and the auxiliary units are enclosed and optionally sealable units such that one compartment is formed by the auxiliary unit, defining an auxiliary space and another compartment is formed by the main unit, defining a main space. That allows the drivetrain to be isolated from the converter and transformer. The two compartments may be joined by the cooperating openings 36 allowing personnel and equipment to enter from the main space in the main unit into the auxiliary space in the auxiliary unit. The openings 36 may be sealed and thereby prevent fire etc. from spreading from one of the main and auxiliary unit to the other one of the main and auxiliary unit.

Figure 4:
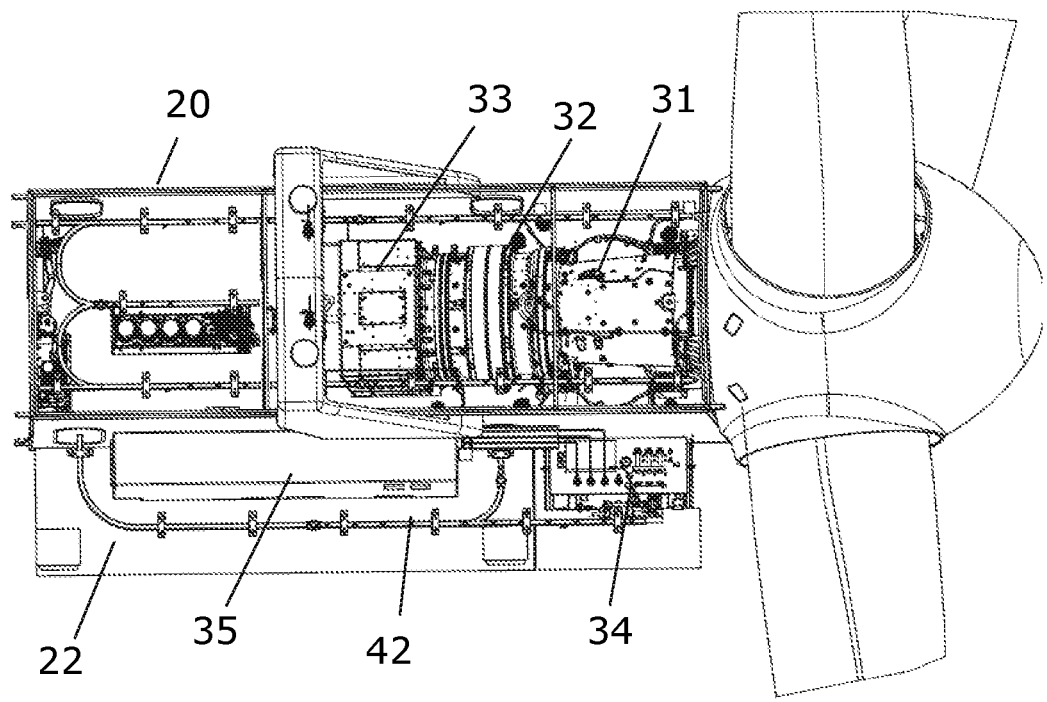
FIG. 4 illustrates the nacelle from FIG. 3 but seen from above.

FIG. 4 illustrates the nacelle from FIG. 3 but seen from above.

Figure 5:
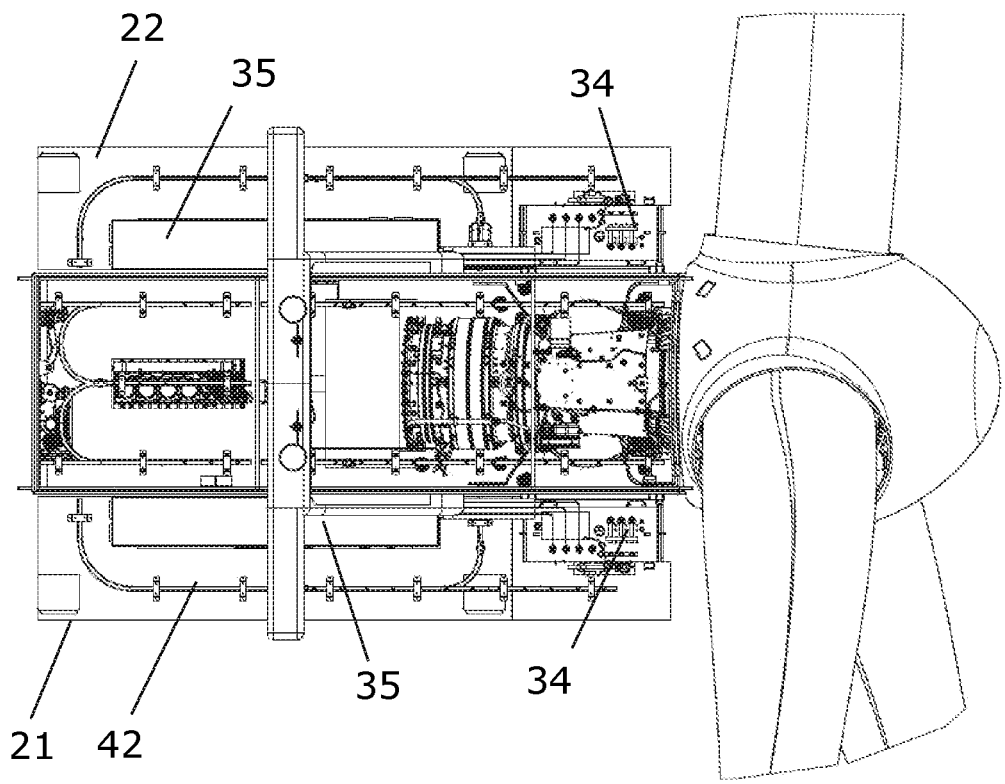
FIG. 5 illustrates an embodiment where the left and right side auxiliary units contain identical operative components.

FIG. 5 illustrates an embodiment where the left and right side auxiliary units contain identical operative components establishing a weight balance and a double function. The double function means that the wind turbine comprises two identically functioning operative components, one contained in each of the auxiliary units. In case of failure, the wind turbine may continue operation on reduced power while the at least one operative component in one of the auxiliary units is replaced.

FIGS. 4 and 5 illustrate a transport system comprising a rail 42 extending from the main unit into the auxiliary unit and allowing easy handling of spare parts etc.

Figure 6:
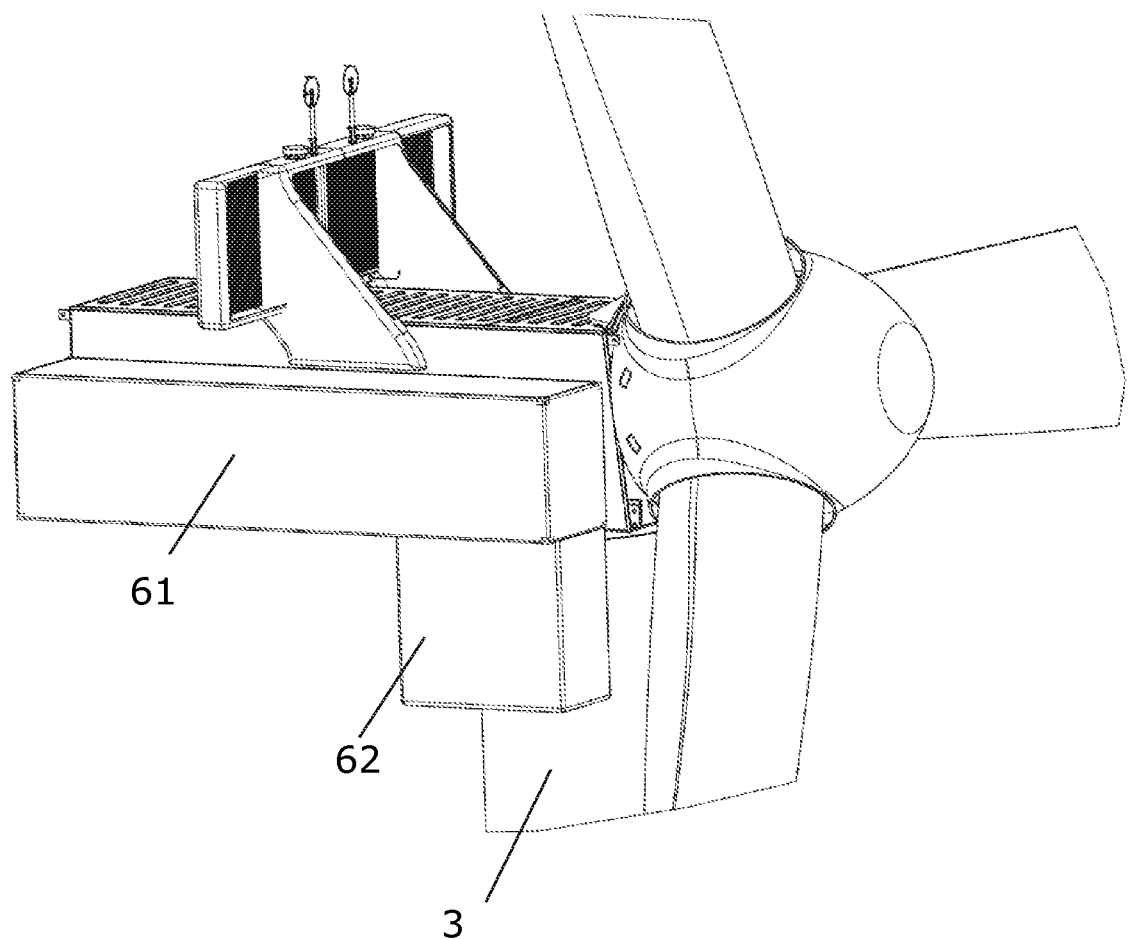
FIG. 6 illustrates an embodiment where the first and second auxiliary units are placed one above the other.

FIG. 6 illustrates an embodiment where two auxiliary units 61, 62 are located one above the other. In this embodiment, the two auxiliary units contain identically functioning operative components, in this case, they both contain a transformer.

Figure 7:
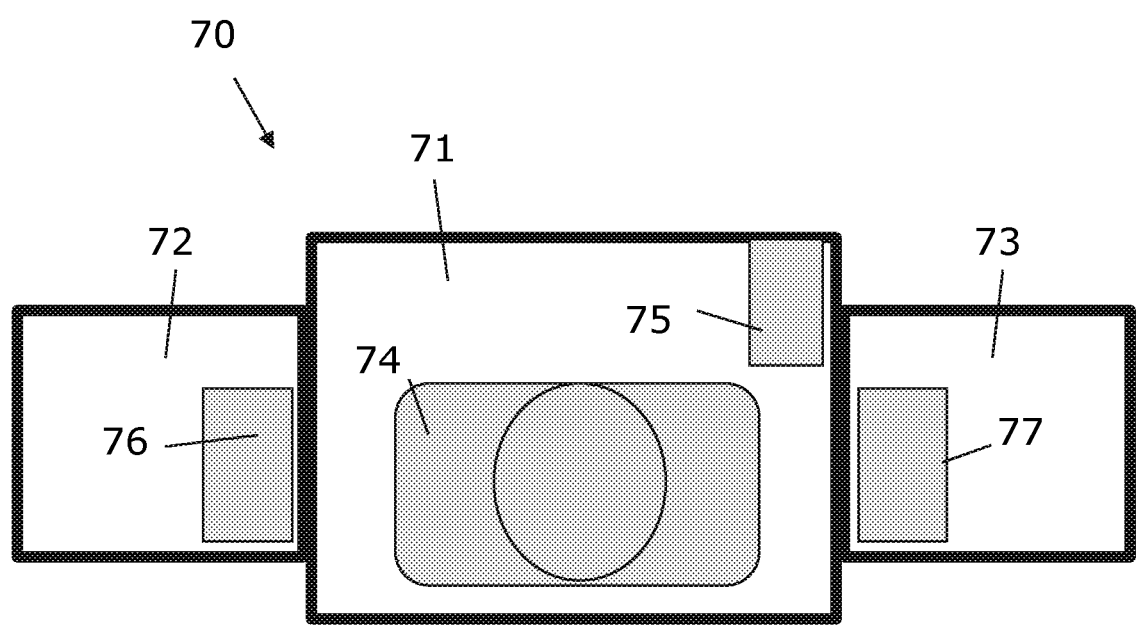
FIG. 7 illustrates an embodiment where the electronic control structure is located in the main unit outside the first auxiliary unit and outside the second auxiliary unit.

FIG. 7 illustrates a nacelle 70 constituted by the main unit 71 and two auxiliary units 72, 73. The main unit houses the rotor-supporting assembly 74 and an electronic control structure 75. Both of the auxiliary units accommodate a transformer 76, 77, i.e. they both accommodate a operative component having a function being identical to a function of the other auxiliary unit. The electronic control structure 75 accommodated in the main unit, i.e. outside the two auxiliary units is configured to control both transformers, and particularly to control the connection of the transformers to the grid. Since the control structure is not accommodated in any of the auxiliary units, it remains in the wind turbine when one of the auxiliary units is released from the wind turbine, e.g. for being replaced in case of malfunction or need for service.

FIGS. 8-11 illustrate in different embodiments how the operative component can be attached to one or both of the main unit and auxiliary unit.

Figure 8:
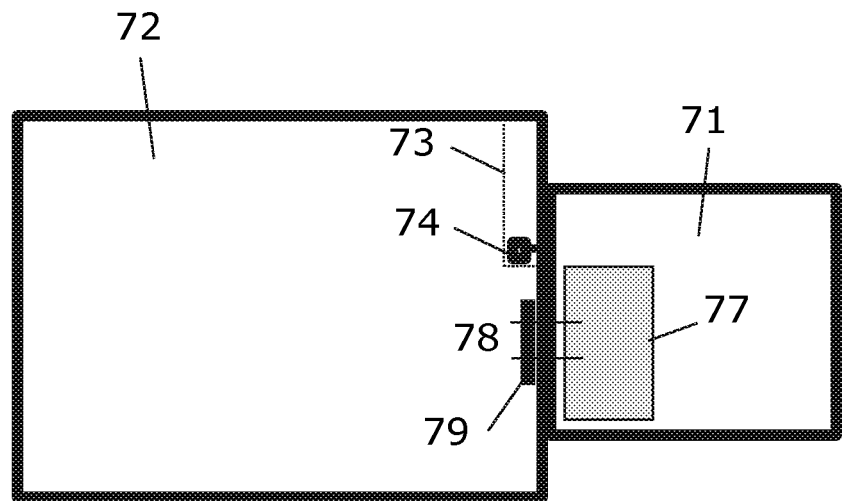
FIG. 8 illustrates schematically means for attaching the auxiliary unit to the main unit.

In FIG. 8, bolt shaped fixation pins 78 engage into the strengthening bracket feature 79. The bolt shaped fixation pins carry the operative component directly to the main unit and creates a load path from the operative component into the tower.

The bracket may be connected to a rigid frame in the main unit, e.g. supported by the main frame to thereby direct loads from the operative component and/or the auxiliary unit directly into the tower via the main frame.

Figure 9:
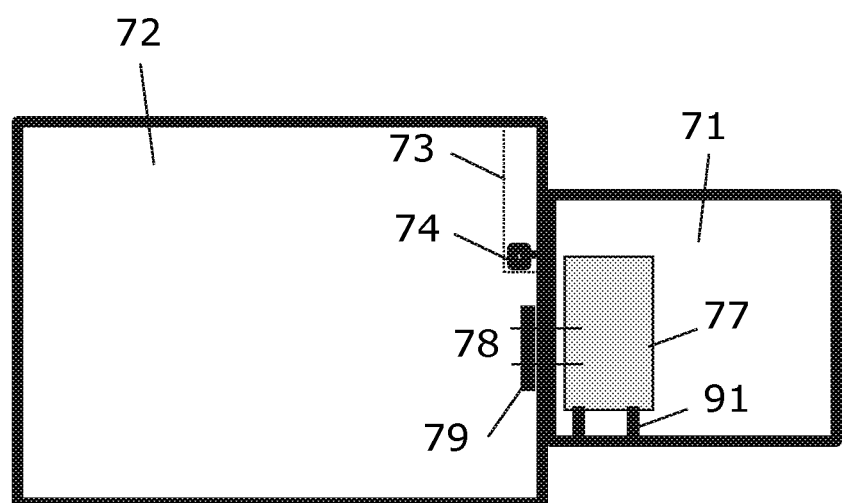
FIGS. 9-10 illustrate schematically different embodiments of interfaces between the operative component and the main or auxiliary unit.

FIG. 9 illustrates an embodiment, where the operative component is supported by support legs 91 between a bottom of the operative component and the bottom of the auxiliary unit.

Figure 10:
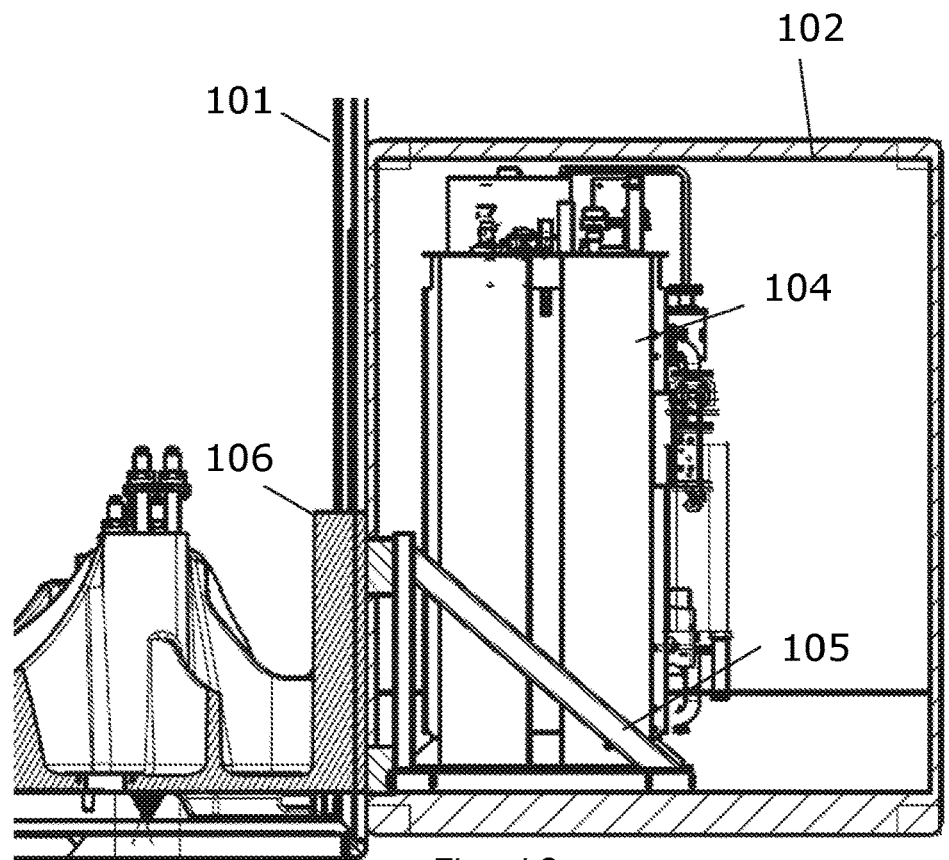

FIG. 10 illustrates in further details another embodiment where the operative component 104 is carried by the support frame 105 resting on the bottom of the auxiliary unit 102 and it is suspended directly on the main frame 106 inside the main unit 101. The main frame thereby forms part of the load path for the operative component into the tower.

At least 50 percent of the weight of the transformer 104 is thereby carried by the main unit 101 and the remaining weight is carried by the auxiliary unit 102, which is again carried by the main unit 101. That remaining part of the weight is thereby not carried directly by the main unit 101.

Figure 11A:
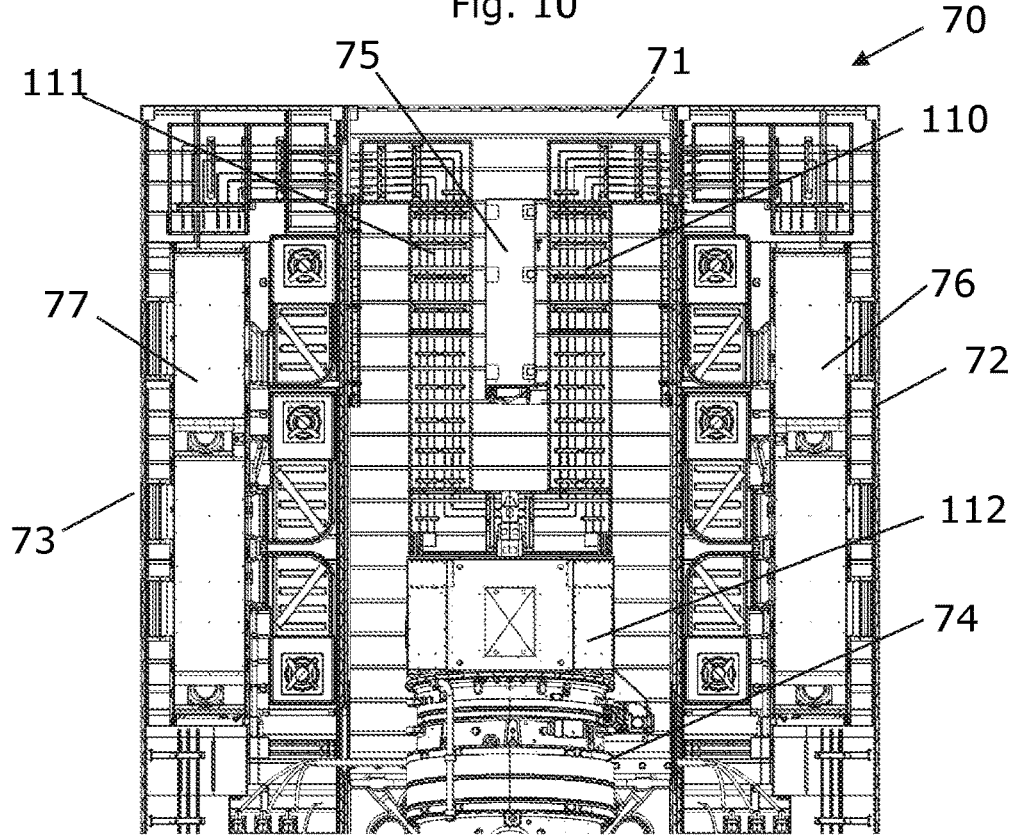

FIGS. 11 and 11a illustrate an embodiment comparable to the embodiment in FIG. 7 but seen from above and illustrated in further details. The nacelle 70 is constituted by the main unit 71 and two auxiliary units 72, 73. The main unit houses the rotor-supporting assembly 74 and an electronic control structure 75. Both of the auxiliary units accommodate a transformer 76, 77. The electronic control structure 75 accommodated in the main unit, i.e. outside the two auxiliary units is configured to control both transformers, and particularly to control the connection of the transformers to the grid.

The nacelle comprises a generator 112 comprising two sets of windings each connected to one of the operative components via the bus-bars 110, 111.

Figure 11B:
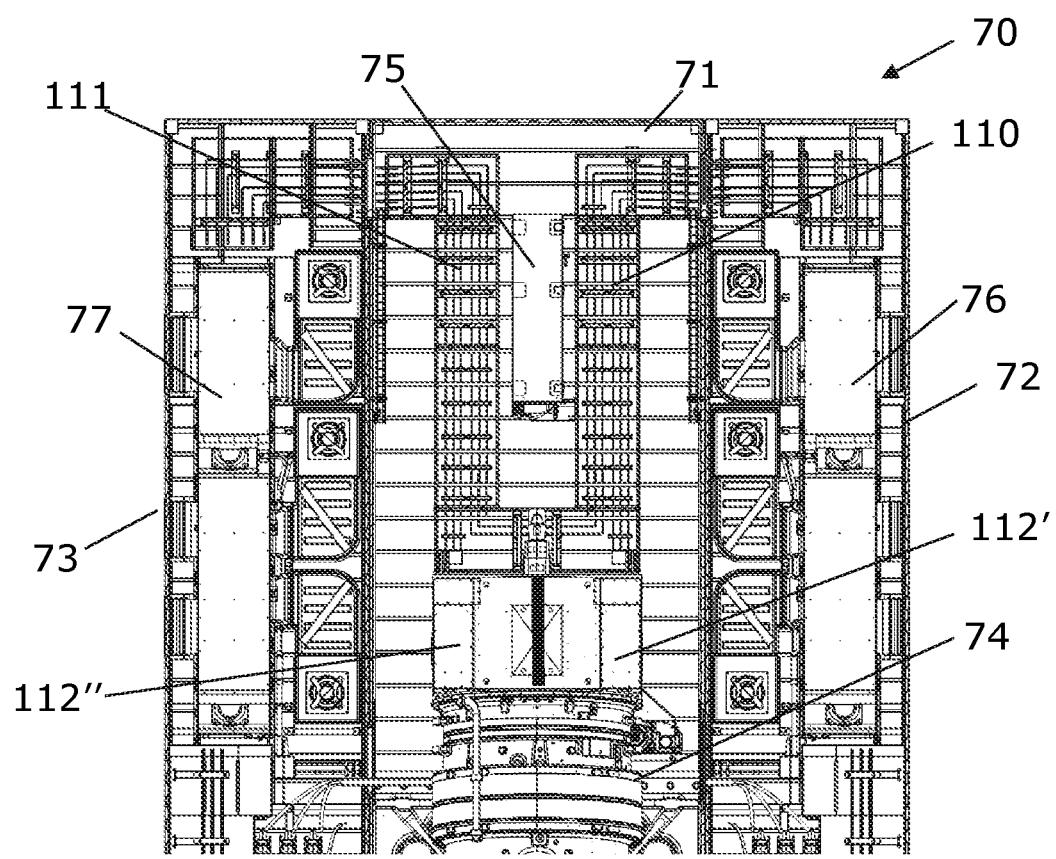

FIG. 11b illustrates an alternative embodiment of the nacelle comprising two generators 112' and 112" both driven by the rotor and connected individually to one of the operative components via the bus-bars 110, 111.

Figure 11C:
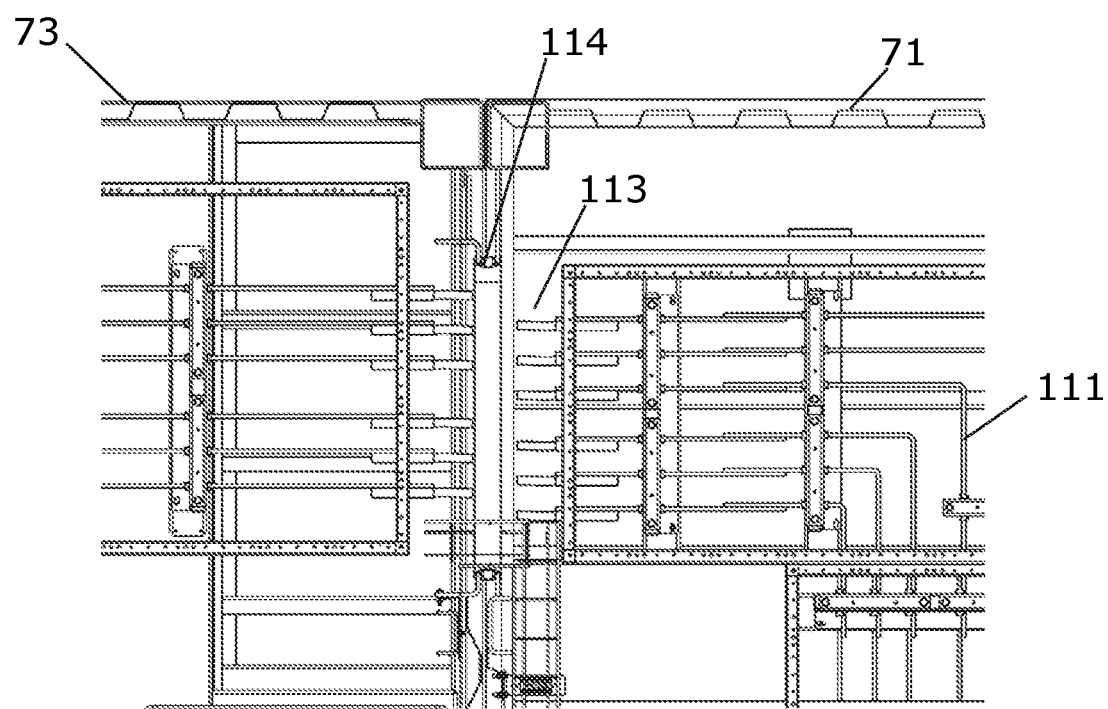
Figure 11D:
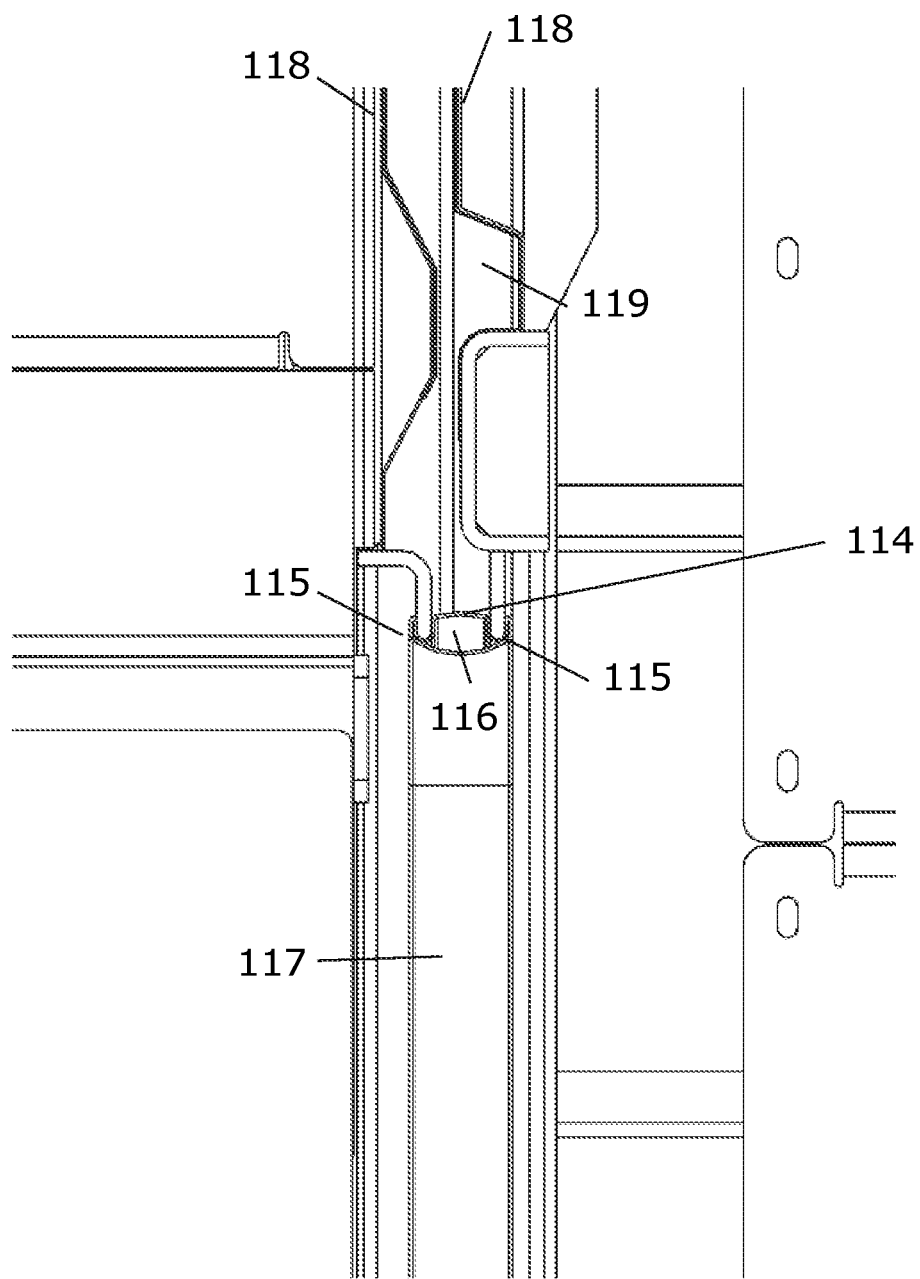

FIG. 11c illustrates an enlarged view of a transition where the bus-bars enters from the main unit to the auxiliary unit. The bus-bars extends across a gap between the two units. In the transition, the bus-bars in the main unit are joined to the bus-bars in the auxiliary unit by flexible connectors 113. The flexible connectors extend across a gap between the main unit and the auxiliary unit. The bus-bars extend through openings through walls of the main unit and auxiliary unit and gaskets 114 seals between the gap and the openings. FIG. 11d illustrates the gasket seal 114 forming two engagement joints 115 connected by a resilient sealing transition 116 forming a sealed duct 117 between the sidewalls 118 of the main and auxiliary units 71, 72. The sealed duct can be used for passing cables etc. between the units, or as access way for personnel.

The sidewalls are corrugated. More particularly, the corrugations of the main unit and the corrugations of the auxiliary unit are different. There is a gap 119 between the corrugated walls whereby air can flow between the main unit and the auxiliary unit. The gap has a size which, due to the corrugations varies along the length of the unit.

FIGS. 12-15 illustrate 4 different embodiments of unit fixation structures forming the interfaces between the main unit and the auxiliary units, i.e. either the first or the second interface. In each of these four illustrations, the main unit 121 and the auxiliary unit 122 are connected by cooperating structures forming the unit fixation structures and being described in further details below.

Figure 12:
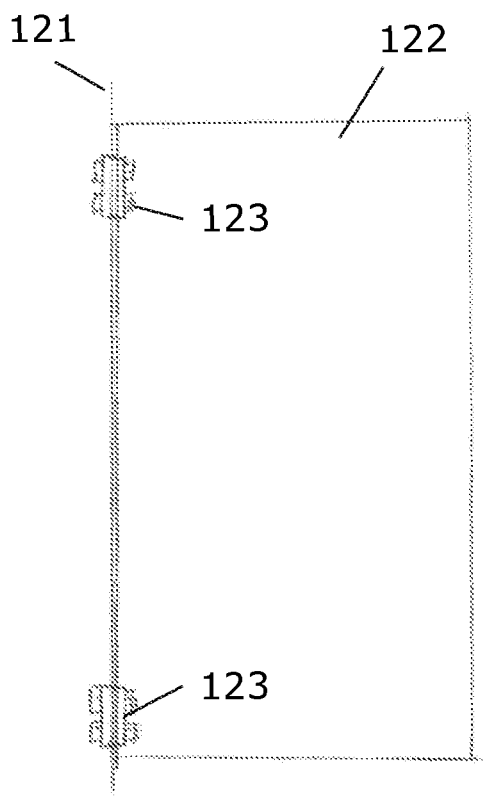

In FIG. 12, the cooperating structures are constituted by brackets 123 by which the main and auxiliary units are joined by bolts.

Figure 13:
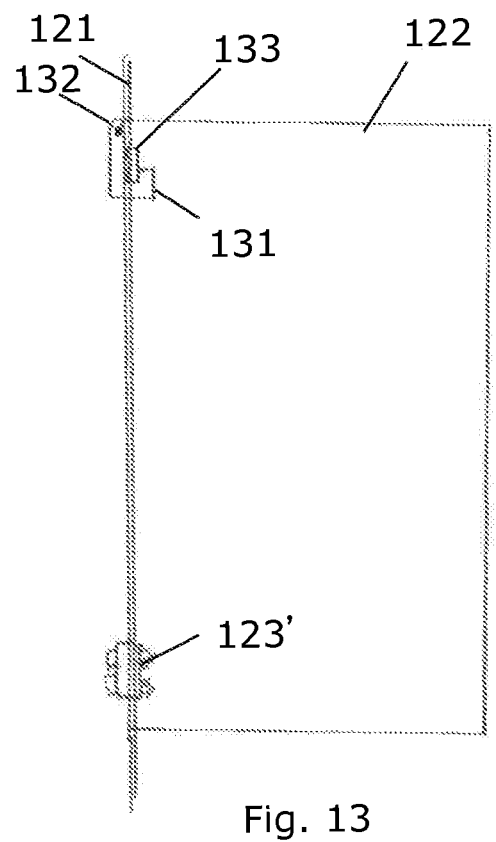

In FIG. 13, the cooperating structures are constituted by a lower bracket 123' like the one used in FIG. 12. At the upper edge, the main unit and auxiliary unit are assembled by a hook 131 pivotally joined to the main unit at the hinge point 132. The hook can rotate as indicated by the arrow 133 and engages the edge-bracket of the auxiliary unit when in the illustrated position. When the lower bracket 123' is removed, and the hook 131 is rotated into the main unit, the auxiliary unit can be lowered to the ground.

Figure 14:
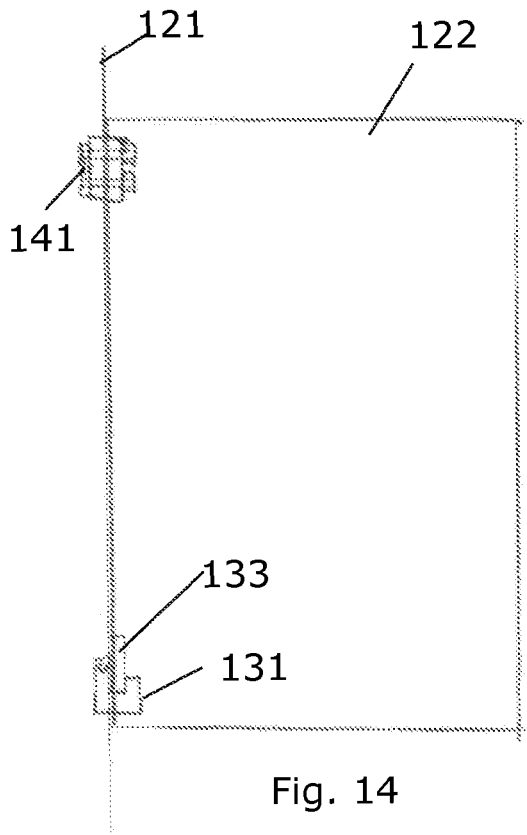

The embodiment in FIG. 14 is comparable to the embodiment in FIG. 13, but where the lower bracket is replaced with an upper bracket 141, and the hook is placed at a lower edge.

Figure 15:
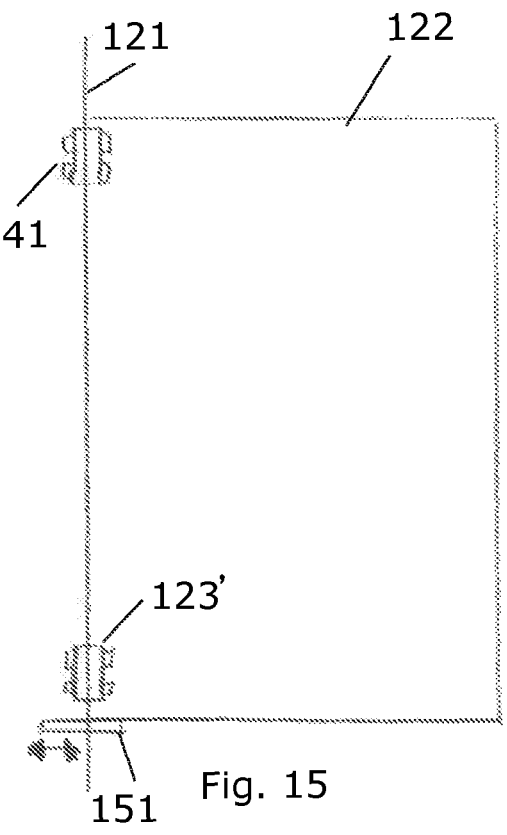

In FIG. 15, a lower and an upper bracket is used for bolting auxiliary unit to the main unit, and a slidable support 151 supports the lower surface of the auxiliary unit while the bolts are attached. If it is desired to lower the auxiliary unit to the ground, e.g. for replacement or maintenance of the operative component, the slidable support can be slid to the left and the auxiliary unit can be lowered down, e.g. by use of a crane build into the main unit.

In any of the embodiments shown in FIGS. 12-15, the brackets or hooks direct the load from the auxiliary unit into a rigid part of the main unit, e.g. into load carrying column e.g. a corner column of the main unit. Various structural features may connect the brackets or hooks which carry the auxiliary unit directly to the main frame in the main unit to thereby establish a load path into the tower.

In addition to the hook and bracket interface illustrated in FIGS. 12-15, a first fixation structure (not shown) connects an operative component (not shown) directly to the main frame inside the main unit.

FIGS. 16-18 illustrate an embodiment where the main unit 161 and auxiliary units 162 are assembled by a hinge structure comprising hinge elements 163, 164, 165 with a hole for receiving a hinge pin 166 extending through the hinge elements. FIG. 16 further shows that the interface forms a gap 167 allowing air to pass e.g. from beneath the nacelle to above the nacelle, through the gap. The gap is held open at the bottom by the distance element 168, which could be constituted by a number of pins or an open structure allowing air to pass between the units 161, 162.

Such a gap may increase thermal convection and thus cooling of the space inside the main and auxiliary units. The gap is not limited to the embodiment with the hinge structure but could be combined with any other assembly method.

FIGS. 17 and 18 illustrate the hinge elements 163, 164, 165 and the hinge pin 166. In FIG. 17, the hinge elements are positioned correctly relative to the each other such that the hinge pin can be slided into the hinge elements. In FIG. 18, the hinge pin is inserted through the holes of the hinge elements 163, 164, 165.

FIG. 19 illustrates further details of a hook for attaching the auxiliary unit 191 to the main unit 192. The hook 193 is suspended rotationally at the hinge 194 in the main unit. The hook can rotate through the opening 195 in the auxiliary unit and catch a recess or edge 196 in the auxiliary unit.

The hook could also be attached in the auxiliary unit and catch a recess or edge in the main unit, in which case it may be attached reversely, i.e. as illustrated in FIG. 20. The position of the hook may be controlled by an actuator.

FIG. 21 illustrates the hook in an open position where the auxiliary unit is free to be lowered to the ground.

FIG. 22 illustrates a cross section where two bolt holes 221 can be seen. The bolt holes facilitate attachment of the auxiliary unit on the main unit by use of bolts for solid fixation. In this embodiment, the hook is mainly for positioning the auxiliary unit in the correct height relative to the main unit, and the bolts are for joining the units.

In FIGS. 19, 21 and 22, the hook is preferably supported by the main frame of the main unit, e.g. via column or support posts arranged along an inner surface of the main unit. In FIG. 19, the column 197 extends along an inner surface of the main unit and supports the hook on the main frame in the bottom part of the main unit.

In FIG. 20, where the hook forms part of the auxiliary unit, the edge in the main unit where the hook engages, may preferably be carried by the main frame in the main unit. Again, this could be via posts or columns arranged along an inner surface of the main unit.

The hook could be moved between the open position (FIG. 21) and the closed position (FIG. 19, 20, 22) by power driven means, e.g. including a hydraulically driven actuator.

FIGS. 23, 24, 25 illustrate an embodiment where the hook is not rotationally suspended but slidingly suspended. The function is similar to the embodiment of FIGS. 19-22. In FIGS. 23 and 24, a cross sectional view illustrates a bolt hole 231 which can be used for solid, bolted fixation of the auxiliary unit on the main unit. The hook in FIG. 23 is attached to the main unit and the hook in FIG. 24 is attached to the auxiliary unit.

Figure 25A:
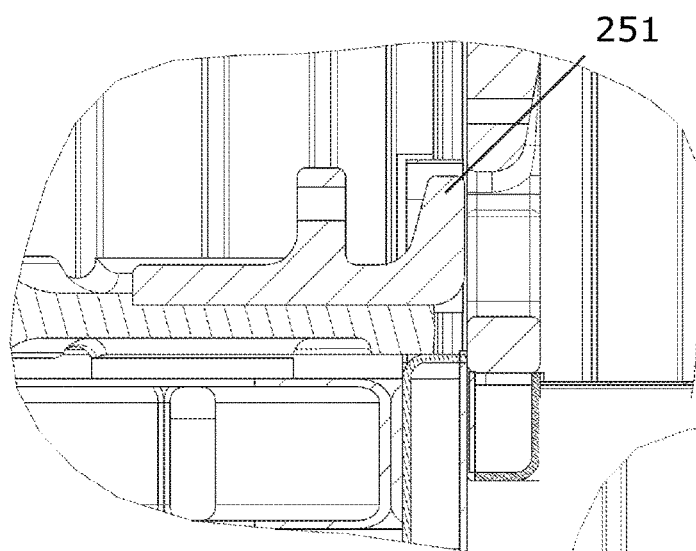
Figure 25B:
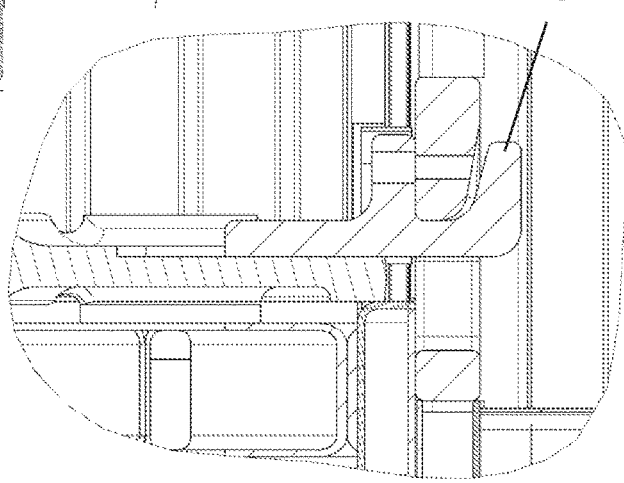

In FIG. 25a, the hook 251 is slided to the left thereby disengaging the edge of the auxiliary unit and allowing the auxiliary unit to be lowered to the ground. In FIG. 25b, the hook 251 is slided to the right, thereby engaging the edge of the auxiliary unit and holding the two units fixed to each other. The hook may be slided by power driven means, e.g. by a hydraulic actuator.

In the description above, FIGS. 19-25 are explained as parts of the unit fixation structure for fixing the auxiliary unit to the main unit. Similar structures may constitute the first fixation structure by which the operative component is releasably fixed to the main unit. Similar structures may also constitute the second fixation structure by which the operative component is releasably fixed to the auxiliary unit, and similar structures may constitute the third fixation structure by which two auxiliary units are fixed to each other.

FIG. 26 illustrates hoisting of an auxiliary unit up or down during maintenance or replacement. The auxiliary unit is hoisted by use of a crane 261 forming part of the main unit. Movement is essentially only in the vertical plane, illustrated by the arrow 263, and the attachment of the auxiliary unit on the main unit may be facilitated by a unit fixation structure as described previously, including movable fixation features such as hinged or slidable hooks etc.

FIG. 27 illustrates the internal crane 261 in an enlarged view. The crane is attached to a roof part of the main unit and by its location, it can hoist the auxiliary unit in a vertical direction to a position where said unit fixation structures can form engagement between the main and the auxiliary units. This procedure may not require movement in other directions than the vertical direction and therefore facilitates a simple assembly procedure with reduced need for external crane assistance. For adjustment in a horizontal plane, the crane 261 may have the option of moving horizontally, e.g. as illustrated by the arrow 262.

FIG. 28 illustrates schematically, another crane structure with a double cantilever beam 281 on the roof of the main unit 282. The cantilever beam 281 can extend sideways in telescopic section 283. The cantilever beam facilitates lifting and connection of the auxiliary unit 284 to the main unit 282. Even though the unit fixation structures disclosed herein, including pivotable or slidable hooks, generally facilitate attachment of the auxiliary unit by hoisting only in the vertical direction, the in and out movement facilitates fine adjustment of a horizontal distance between the main unit and the auxiliary unit.

Definitions

Herein, the term "nacelle" means the generally accepted term describing the machine house for a wind turbine, i.e. that part which carries the rotor and drivetrain and which is carried by the wind turbine tower.

The terms "main unit" and "auxiliary unit" herein refers to units which can be transported separately, and which can be assembled with one or more other units to form the nacelle.

Herein, the term "rotor-supporting assembly" refers to those parts of the nacelle which carries the rotor, typically a drivetrain, a main bearing and a main frame. The drivetrain may include different components depending on the type of wind turbine, e.g. a rotor shaft, the generator, and optionally a gearbox between the rotor shaft and the generator.

Herein, the term "identically functioning components" means that the components perform essentially the same function but they may or may not have different internal configuration, different rating, or they may be produced by different manufacturer. As an example, two components having same function but with different power levels are identically functioning within this meaning. As another example, two components provide the same function, e.g. conversion from AC to DC and/or from DC to AC may be identically functioning irrespective of the specific technical implementation of this function. This allows that power conversion is shared between two components, or it allows continued operation of the wind turbine at reduced capacity if one of the components has a malfunction.

The invention claimed is:

1. A wind turbine nacelle configured for mounting on a wind turbine tower and housing a rotor-supporting assembly defining a rotational axis and comprising a power conversion assembly, the nacelle comprising:
   a main unit arranged to be connected to a wind turbine tower and housing the rotor-supporting assembly,
   a first auxiliary unit, and
   a second auxiliary unit;
   wherein:
   the main unit, the first auxiliary unit, and the second auxiliary unit are separate units,
   the first auxiliary unit is assembled to the main unit in a first interface,
   the second auxiliary unit is assembled to the main unit in a second interface, and
   the first auxiliary unit accommodates a first operative component forming part of the power conversion assembly and having a function being identical to a function of a corresponding second operative component accommodated in the second auxiliary unit, the first and second operative components being configured to be controlled by an electronic control structure which is not accommodated in any of the first auxiliary unit and the second auxiliary unit.

2. The nacelle according to claim 1, wherein the electronic control structure is accommodated in the main unit.

3. The nacelle according to claim 1, wherein the electronic control structure is accommodated outside the main unit.

4. The nacelle according to claim 1, wherein the electronic control structure is configured for independent operation of one or both of the first and second operative components.

5. The nacelle according to claim 1, comprising a bus-bar structure forming electrical connection from the electronic control structure to the first and the second operative components.

6. The nacelle according to claim 5, wherein the bus-bar extends from the main unit into the first and second auxiliary units.

7. The nacelle according to claim 1, wherein both the first operative component and the second operative component are coupled electrically to a switching structure, the switching structure being arranged between the first and second operative components and a power grid and configured for selection between the first operative component, the second operative component, or both the first and the second operative components being connected to the power grid.

8. The nacelle according to claim 7, wherein the switching structure is in the nacelle or at a base of the tower.

9. The nacelle according to claim 1, wherein the first interface and the second interface are both configured for independent fixation of the corresponding auxiliary unit and wherein the first interface and the second interface allow release of the corresponding auxiliary unit independent of the other auxiliary unit.

10. The nacelle according to claim 1, wherein the first auxiliary unit and the second auxiliary unit are separated by a plane determined by the rotational axis.

11. The nacelle according to claim 1, wherein one of the first or the second auxiliary units is arranged above another one of the first or the second auxiliary units on one side of the main unit to form a lower and an upper auxiliary unit.

12. The nacelle according to claim 1, comprising a crane structure attached to the main unit and configured to hoist the first or the second auxiliary unit from ground to a position where a unit fixation structure can connect the first or the second auxiliary unit to the main unit.

13. The nacelle according to claim 12, wherein the crane structure is configured to hoist the first or the second auxiliary unit in a vertical direction without moving the first or the second auxiliary unit in a horizontal direction.

14. The nacelle according to claim 1, wherein both the first operative component and the second operative component are selected from the group consisting of: transformers, converters, batteries, and electrolysis cells.

15. The nacelle according to claim 1, comprising a generator housed in the nacelle.

16. The nacelle according to claim 1, wherein the electronic control structure is located outside the nacelle, and the nacelle comprises a communication structure for communicating control signals between the operative components and the electronic control structure, the communication structure comprising a cable connection out of the nacelle.

17. A wind turbine with the tower and the nacelle according to claim 1.

18. The wind turbine according to claim 17, comprising a generator located outside the nacelle.

19. The wind turbine according to claim 17, wherein the electronic control structure is accommodated in the tower.

20. A method of operating a wind turbine with the nacelle according to claim 1, during malfunction in the first operative component forming part of the power conversion assembly, the method comprising:
　　identifying the first operative component that is malfunctioning;
　　identifying the first auxiliary unit housing the first operative component that is malfunctioning;
　　disconnecting the first operative component from the wind turbine;
　　disconnecting the first auxiliary unit housing the first operative component;
　　connecting a substitute auxiliary unit housing a replacement operative component; and
　　connecting the replacement operative component to the wind turbine.

21. The method according to claim 20, comprising the step of continuing operation of the wind turbine by use of the second operative component having a function being identical to the function of the first operative component until the substitute auxiliary unit housing the replacement operative component has been connected to the wind turbine.

22. The method according to claim 21, comprising controlling the first operative component, the second operative component having a function being identical to the function of the first operative component, and the replacement operative component by use of the same electronic control structure.

23. The method according to claim 22, wherein all operative components are controlled from a location outside the first and second auxiliary units.

\* \* \* \* \*